United States Patent [19]

Nakayama et al.

[11] Patent Number: 5,660,579
[45] Date of Patent: Aug. 26, 1997

[54] METHOD AND APPARATUS FOR FORMING A GRINDING WHEEL

[75] Inventors: Yoshiro Nakayama; Osamu Yasuda; Kouzo Nomura, all of Tokyo, Japan

[73] Assignee: Mitsubishi Denki Kabushiki Kaisha, Tokyo, Japan

[21] Appl. No.: 696,162

[22] Filed: Aug. 13, 1996

[30] Foreign Application Priority Data

Aug. 18, 1995 [JP] Japan .................. 7-210638

[51] Int. Cl.$^6$ .................. B24B 49/00; B24B 51/00
[52] U.S. Cl. .................. 451/21; 451/1; 451/56; 451/72; 451/443; 125/11.01; 205/654; 205/663
[58] Field of Search .................. 451/21, 443, 56, 451/72, 1; 125/11.01, 11.02, 11.04; 204/224 M, 225, 206, 217; 205/652, 654, 662, 663

[56] References Cited

U.S. PATENT DOCUMENTS

| | | | |
|---|---|---|---|
| 4,508,604 | 4/1985 | Inoue | 204/224 |
| 4,736,656 | 4/1988 | Futamura | 76/107 R |
| 4,847,463 | 7/1989 | Levy et al. | 219/69.12 |
| 5,045,664 | 9/1991 | Nakagawa et al. | 219/69.2 |
| 5,547,414 | 8/1996 | Ohmori | 451/21 |

*Primary Examiner*—Robert A. Rose
*Assistant Examiner*—George Nguyen
*Attorney, Agent, or Firm*—Sughrue, Mion, Zinn, Macpeak & Seas

[57] ABSTRACT

The metal bond wheel forming apparatus includes rotation speed control means 11 for controlling the rotation speed of a grinding wheel 6; energy control means 9 for controlling discharge energy that is supplied to the gap between a wire electrode 1 and the grinding wheel 6; relative speed control means 17 for controlling a relative movement speed either for the wire electrode 1 or for the grinding wheel 6; and detailed machining control means 23 for controlling the rotation speed control means, the energy control means and the relative speed control means, for setting the rotation speed of the grinding wheel and discharge energy appropriate for detailed machining, and for setting the relative movement speed for the wire electrode or for the grinding wheel to enable high speed shaping during the detailed machining.

22 Claims, 25 Drawing Sheets

FIG.3
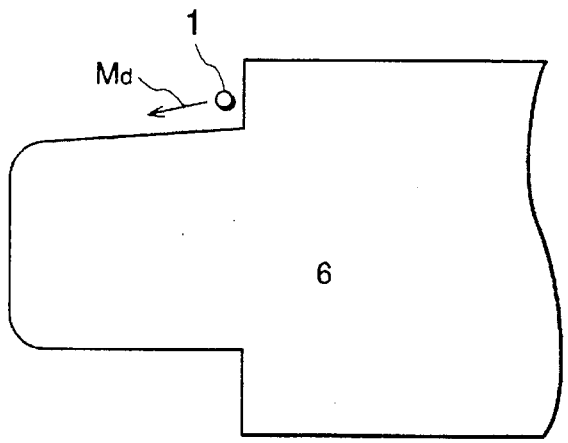
$W_{n1}$: FIRST STEP
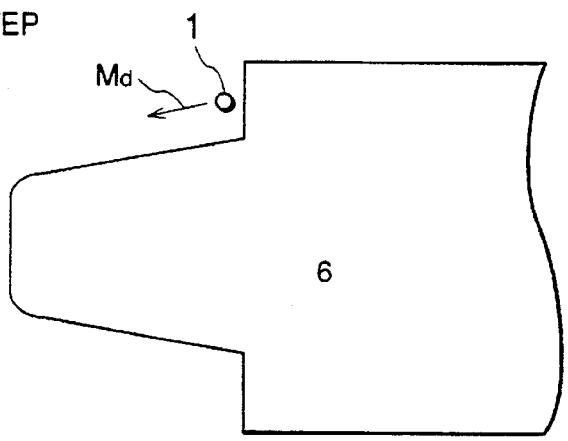
$W_{n2}$: SECOND STEP
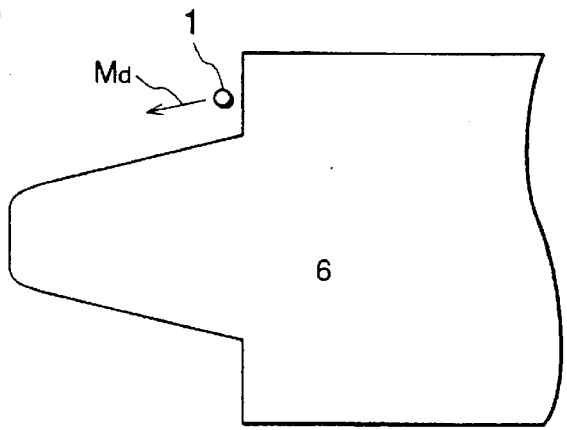
$W_{n3}$: THIRD STEP

FIG.4

|  | $W_{n1}$ | $W_{n2}$ | $W_{n3}$ |
|---|---|---|---|
| VOLTAGE | 100V | 80V | 60V |
| PEAK CURRENT | 150A | 120A | 100A |
| ON TIME | 1 μs | 1 μs | 5 μs |
| OFF TIME | 10 μs | 10 μs | 10 μs |
| RELATIVE MOVEMENT SPEED | 0.5mm | 0.3mm | 0.2mm |

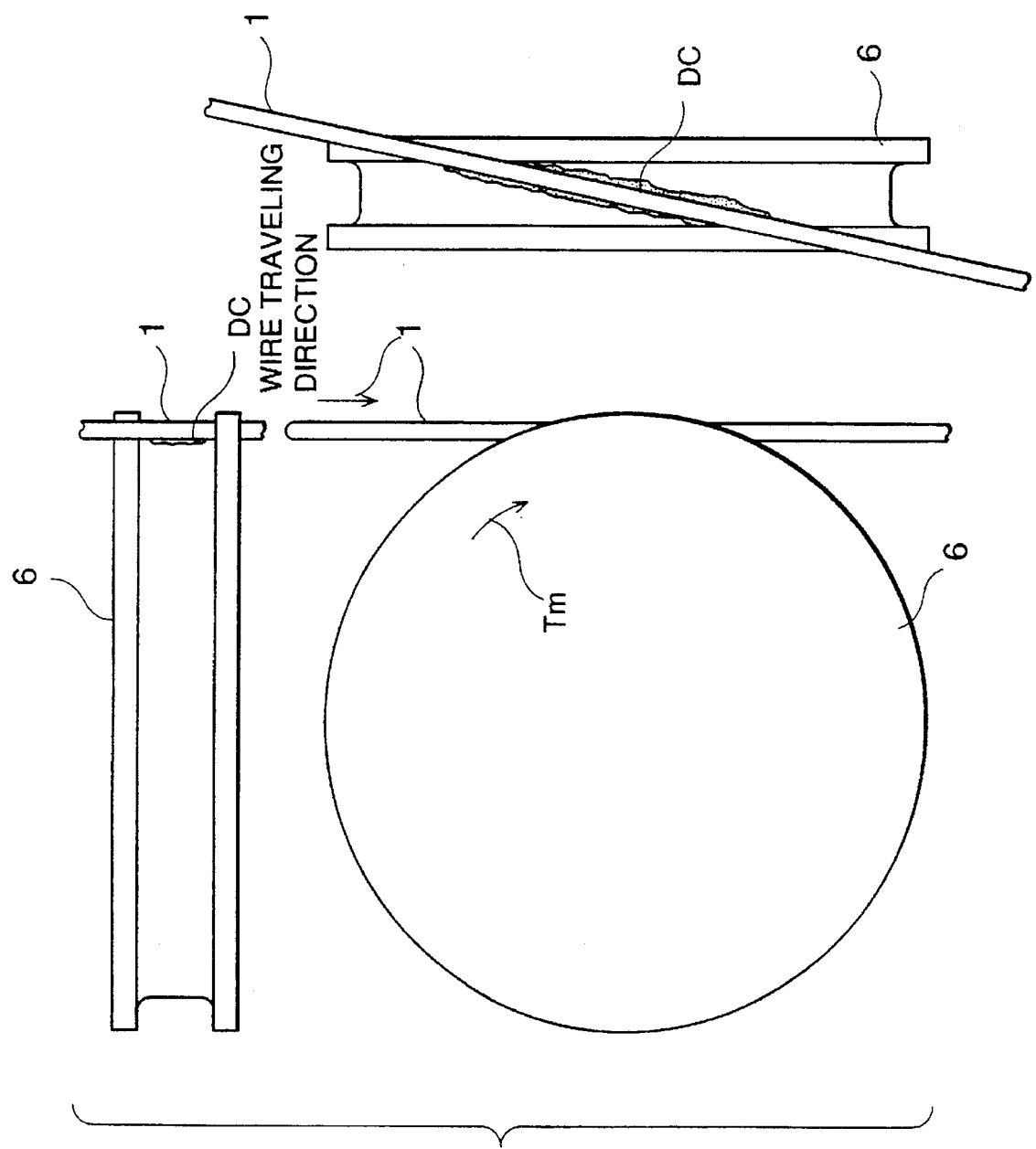

FIG.22A
FIG.22B
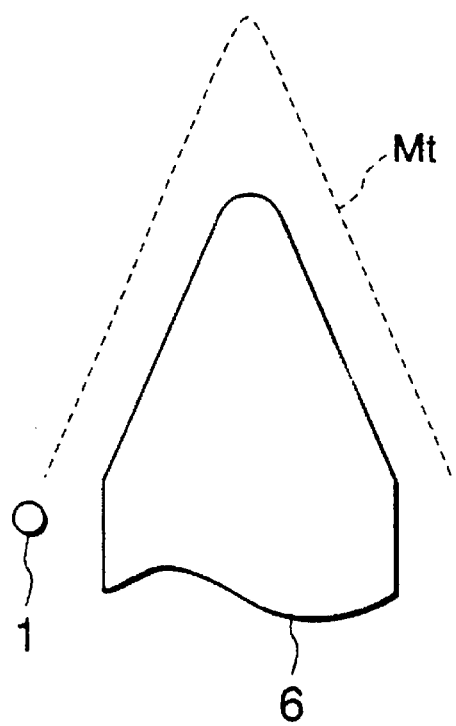
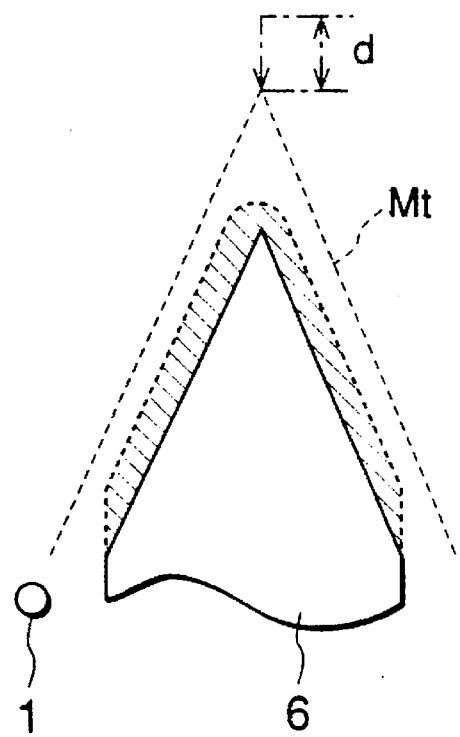

FIG.26

|  | E100 | E101 | E102 | E103 |
|---|---|---|---|---|
| VOLTAGE | 100 | 90 | 80 | 70 |
| PEAK CURRENT | 150 | 130 | 110 | 100 |
| ON TIME | 1 | 1 | 3 | 5 |
| OFF TIME | 10 | 10 | 10 | 10 |
| REFERENCE SPEED | 0.5 | 0.4 | 0.3 | 0.3 |
| REFERENCE VOLTAGE | 50 | 50 | 60 | 60 |
| WIRE TENSION | 1000 | 1000 | 1100 | 1200 |
| WHEEL ROTATION COUNT | 500 | 400 | 200 | 100 |
| CORRECTION AMOUNT | 0.05 | 0.05 | 0.05 | 0.04 |

METHOD AND APPARATUS FOR FORMING A GRINDING WHEEL

FIELD OF THE INVENTION

The invention relates to grinding wheel production, specifically to an apparatus and method for forming a grinding wheel by inducing an electric discharge through a processing fluid at a gap between a wire electrode and the grinding wheel.

DESCRIPTION OF THE RELATED ART

Grinding wheels are formed using apparatuses which remove portions of the grinding wheel material to produce a desired shape. Grinding wheels are commonly used as machining tools in the materials processing industries. Production and re-shaping of grinding wheels often require a lengthy, complicated, labor-intensive and generally efficient process. For this reason, there is a need for a more efficient apparatus and method for more accurately forming and shaping grinding wheels. Packalin (U.S. Pat. No. 5,194,126) discloses a conventional method and apparatus for dressing grinding wheels having an electrically conductive bond, and is representative of the prior art which is time and energy inefficient, and which lacks high accuracy in the shaping of grinding wheels.

FIG. 27 is a schematic diagram illustrating a conventional metal bond wheel forming apparatus which includes: a metal bond wheel 6; a rotatable shaft 38 fixed to the metal bond wheel 6; a rotation means 10 for rotating the metal bond wheel 6 via the shaft 38; a rotational speed control means 11 for controlling the rotational speed of the metal bond wheel 6 produced by the rotation means 10; a shaping electrode 46 for shaping the metal bond wheel 6; a shank 47 fixed to the shaping electrode 46; an electrode fixing means 48 for fixing the forming electrode 46 by inserting the shank 47 into the shaping electrode 46; a driving means 49 for driving the shaping electrode 46 toward the metal bond wheel 6; a numerical control means 16 for controlling the driving means 49 to move the shaping electrode 46 and the metal bond wheel 6 in relation to each other; a machining power source 8 for applying a pulse voltage at a gap between the shaping electrode 46 and the metal bond wheel 6; an energy control means 9 for controlling the discharge energy of the power source 8; a voltage detection means 50 for detecting a voltage between the shaping electrode 46 and the metal bond wheel 6; a gap adjustment means 51 for adjusting a gap in response to the voltage detected by the voltage detection means 50; and a processing tank 52 in which the shaping electrode 46 and the metal bond wheel 6 are placed and in which processing fluid is held.

FIG. 28 is a cross sectional view of a conventional arrangement for shaping the metal bond wheel 6 by generating an electric discharge at a gap between the metal bond wheel 6 and the electrode 46. The dotted area labeled 46d depicts sludge, as waste material, generated during the discharge process, and the dotted area indicates an accuracy failure portion 6d. The operation of a conventional grinding wheel formation process will now be described referencing FIG. 27 and FIG. 28.

In FIG. 27, the metal bond wheel 6 is attached to the shaft 38. As the shaft 38 is rotated by the rotation means 10, the metal bond wheel 6 is rotated. The rotation direction is constant, and the rotation speed is controlled by the rotation speed control means 11.

The shaping electrode 46 is fixed to the shank 47; the shaping electrode 46 is then fixed to the electrode fixing means 48 via the shank 47. The shaping electrode 46 is driven toward the metal bond wheel 6 by the driving means 49 that is controlled by the numerical control means 16.

The shaping electrode 46 and the metal bond wheel 6 are immersed in the processing fluid in the processing tank 52. A pulse voltage is applied to the shaping electrode 46 and the metal bond wheel 6, by the machining power source 8; the shaping electrode 46 is moved by the driving means 49 until it is close to the metal bond wheel 6. This movement is controlled by the numerical control means 16, so that an electric discharge used for shaping is generated. The individual switches of the machining power source 8 are controlled by the energy control means 9 and are employed to set discharge energy for a desired condition. The voltage detection means 50 detects the discharge condition at the gap between the shaping electrode 46 and the metal bond wheel 6. The gap control means 51 controls the numerical control means 16 to maintain a constant gap between the shaping electrode 46 and the metal bond wheel 6. In this way a constant discharge condition is maintained.

Because the conventional forming method uses an electric discharge to transfer the shape of the shaping electrode 46 to the metal bond wheel 6, the accuracy with which the operation using the shaping electrode 46 is performed affects the accurate shaping of the meal bond wheel 6; also the formation of different metal bond wheels 6 requires differently contoured shaping electrodes 46. To repeat formation of the same shape requires a new shaping electrode 46, as the shaping electrode 46 is worn out after it has been used several times. Furthermore, as is shown in FIG. 28, the discharge waste material sludge 46d tends to collect at the rear wall of the shaping electrode 46. This accumulation of discharge waste results in an accuracy failure 6d due to the production of secondary electrode discharges.

SUMMARY OF THE INVENTION

Accordingly, the present invention has been made to solve the above-described problems and has an object of providing a grinding wheel forming apparatus and a grinding wheel forming method with a reduced processing time and an increased shaping accuracy. This is accomplished utilizing numerous improvements to the conventional grinding wheel forming apparatus. Specifically, the shaping accuracy improvement and reduction in necessary shaping time are accomplished by: (1) separately performing the initial and the detailed machining at high speeds; (2) increasing the movement speed between portions requiring detailed machining; (3) maintaining the discharge concentration and the wire electrode vibration at low levels during distal end shaping; (4) providing a curved locus for the relative movements of the wire electrode before the shaping start point and immediately before the end point thereby eliminating bites; (5) running the wire electrode in the same direction as the rotational direction of the grinding wheel to prevent cutting of the wire electrode; (6) inclining the wire electrode to produce wide grooves; (7) reducing the size change of the discharge gap; (8) detecting wire electrode deflection and correcting the wire electrode movement locus for machine shape shifts due to wire electrode deflection; (9) controlling grinding wheel rotation in response to changing wire electrode diameter; (10) changing the wire electrode diameter to correspond to the type of machining step (e.g., initial shaping performed perpendicular or parallel to the grinding wheel, detailed machining of an inclined or arched portion); (11) adjusting grinding wheel rotation speed in accordance with the use of differing wire electrode diameters; (12) determining the wire electrode diameter by detecting wire electrode tension and grinding wheel rotation speed; (13) establishing a reshaping process for worn out grinding wheels which considers the original shaping locus used to generate the grinding wheel; (14) establishing a reshaping process for worn out grinding wheels which is capable of utilizing operating conditions such as required grinding time, grinding wheel material, and particular grinding process events required during the shaping schedule specific to the grinding wheel being re-shaped; (15) eliminating the need for rotating the grinding wheel prior to the shaping process by correcting positions along the rotary shaft to compensate for the deviation between shaft temperature and room temperature; (16) utilizing and storing shaping parameters such as discharge energy, wire tension, wheel rotation speed, reference speed, and reference voltage.

A grinding wheel forming apparatus according to the present invention comprises a rotation speed control means for controlling the rotation speed of the grinding wheel; an energy control means for controlling discharge energy that is supplied to the gap between the wire electrode and the grinding wheel; a relative speed control means for controlling a movement speed either for the wire electrode or for the grinding wheel; and detailed machining control means for controlling the rotation speed control means, the energy control means and the relative speed control means. This detailed machining control means sets the rotation speed of the grinding wheel and the discharge energy so as to be appropriate for detailed machining. The detailed machining control means also sets the movement speed for the wire electrode or for the grinding wheel so as to enable high speed shaping during the detailed machining.

A grinding wheel forming method according to the present invention comprises rotating a grinding wheel via a rotation means, controlling a rotation speed of the rotating grinding wheel by using a rotation speed control means, controlling a relative movement speed between a wire electrode and the grinding wheel using a relative speed control means, running the wire electrode across the rotating grinding wheel while the wire electrode and the rotating grinding wheel are moving relative to each other, and generating a discharge via a processing fluid at a gap between the wire electrode and the grinding wheel in order to shape the grinding wheel.

Other objects and advantages of this invention will become apparent from the detailed description given hereafter. It should be understood, however, that the detailed descriptions and specific embodiments are provided by way of illustration because various changes and modifications within the spirit and scope of the invention will become evident to those skilled in the art from this detailed description.

BRIEF DESCRIPTION OF THE DRAWING

FIG. 3 is a diagram depicting the detailed machining performed a plurality of times for the grinding wheel forming method according to Embodiment 1 of the invention.

FIG. 4 is a diagram delineating the shaping conditions for the detailed machining in FIG. 3.

FIG. 9 is a diagram illustrating a shaping method according to which a wire electrode is inclined to the grinding wheel forming apparatus according to Embodiment 1 of the invention.

FIGS. 22A and 22B are diagrams depicting a shaping method for the grinding wheel forming apparatus according to Embodiment 4 of the invention.

FIG. 26 is a diagram showing a screen which displays shaping conditions for the grinding wheel forming apparatus according to Embodiment 6 of the invention.

In all figures, the same and substantially similar elements are identified by the same reference numbers.

DESCRIPTION OF PREFERRED EMBODIMENTS

Embodiment 1.

Figure 1:
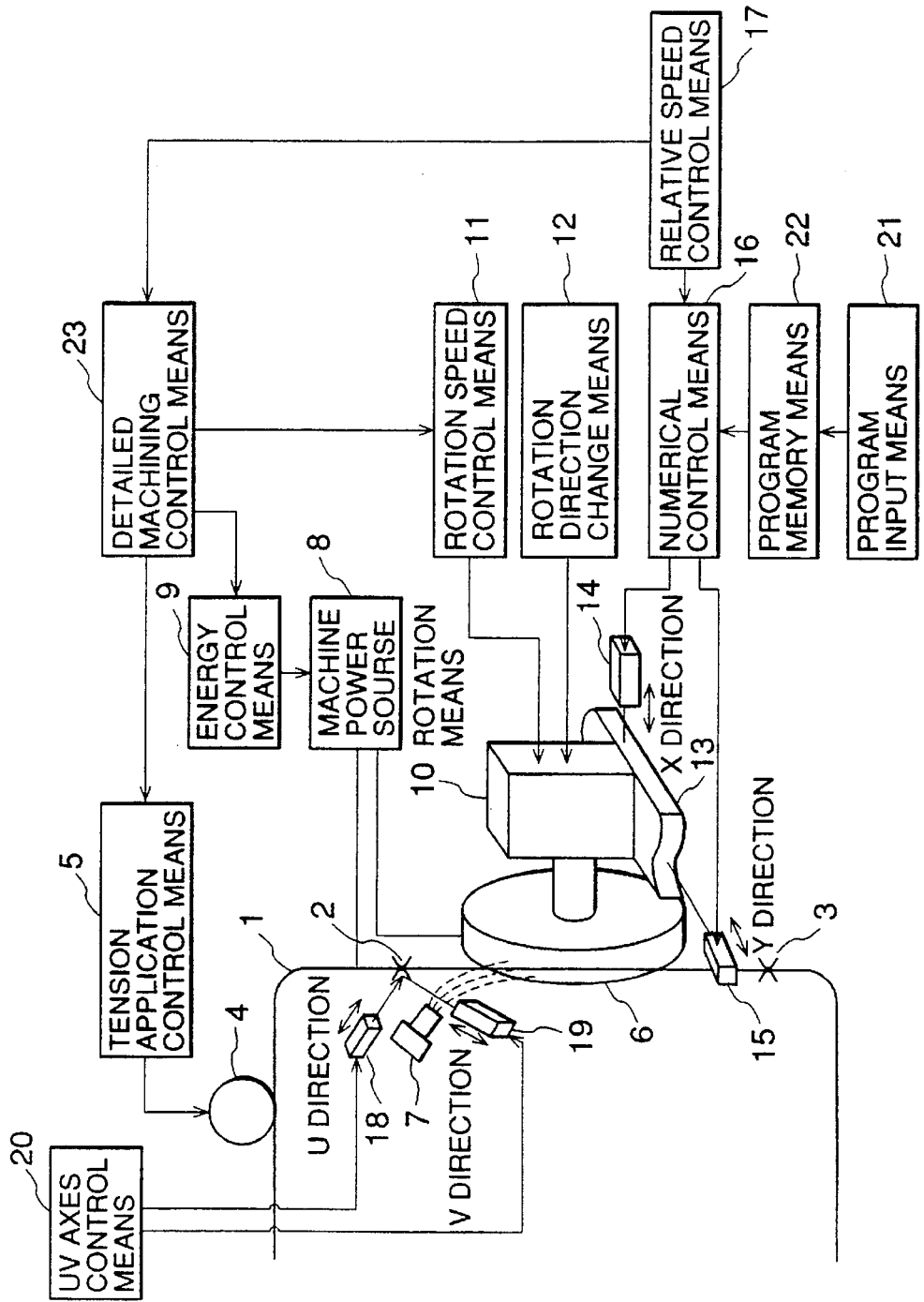
FIG. 1 is a schematic diagram illustrating the arrangement of a grinding wheel forming apparatus according to Embodiment 1 of the invention.

FIG. 1 is a schematic diagram illustrating the arrangement of a grinding wheel forming apparatus according to Embodiment 1 of the invention.

In FIG. 1, the grinding wheel forming apparatus includes a wire electrode 1 which is wire used as an electrode; one portion of an upper wire guide 2 along which the wire electrode 1 is guided; the other portion of a lower wire guide 3 along which the wire electrode 1 is guided; tension application means 4 for applying tension to the wire electrode 1; tension application control means 5 for controlling the tension that is to be applied to the wire electrode 1; a metal bond wheel 6 such as a grinding wheel; a processing fluid supply nozzle 7 through which a processing fluid is supplied to a gap between the wire electrode 1 and the metal bond wheel 6; a machining power source 8 for supplying a pulse voltage at the gap between the wire electrode 1 and the metal bond wheel 6; energy control means 9 for changing a voltage, a pulse width and a halt duration for the machining power source, and thus controlling the supply of energy; rotation means 10 for rotating the metal bond wheel 6; rotation speed control means 11 for controlling the number of rotations of the rotation means 10; rotation direction change means 12 for changing the direction in which the metal bond wheel 6 rotates; a table 13 to which the rotation means 10 is fixed; an X axial motor 14 for moving the table 13 in the X axial direction; a Y axial motor 15 for moving the table 13 in the Y axial direction; numerical control means 16 for controlling the values for the X axial motor 14 and the Y axial motor 15 so as to move the table 13 freely; relative speed control means 17 for controlling the speed at which the table is moved; a U axial motor 18 for moving the wire guide 2 in the U direction so as to incline the wire electrode 1; a V axial motor 19 for moving the wire guide 2 in the V direction so as to incline the wire electrode 1; UV axes control means 20 for controlling the U axial motor 18 and the V axial motor 19; program input means 21 for inputting a program for freely moving the wire electrode 1 and the metal bond wheel 6 relative to each other; program memory means 22 for storing a program that is input by the program input means 21; and detailed machining control means 23 for controlling the energy control means 9, the tension control means 5, the rotation speed control means 11 and the relative speed control means 17 so as to perform detailed machining.

Before explaining the processing, a rough description will be given of the diagrams relating to Embodiment 1 of the invention.

Figure 2:
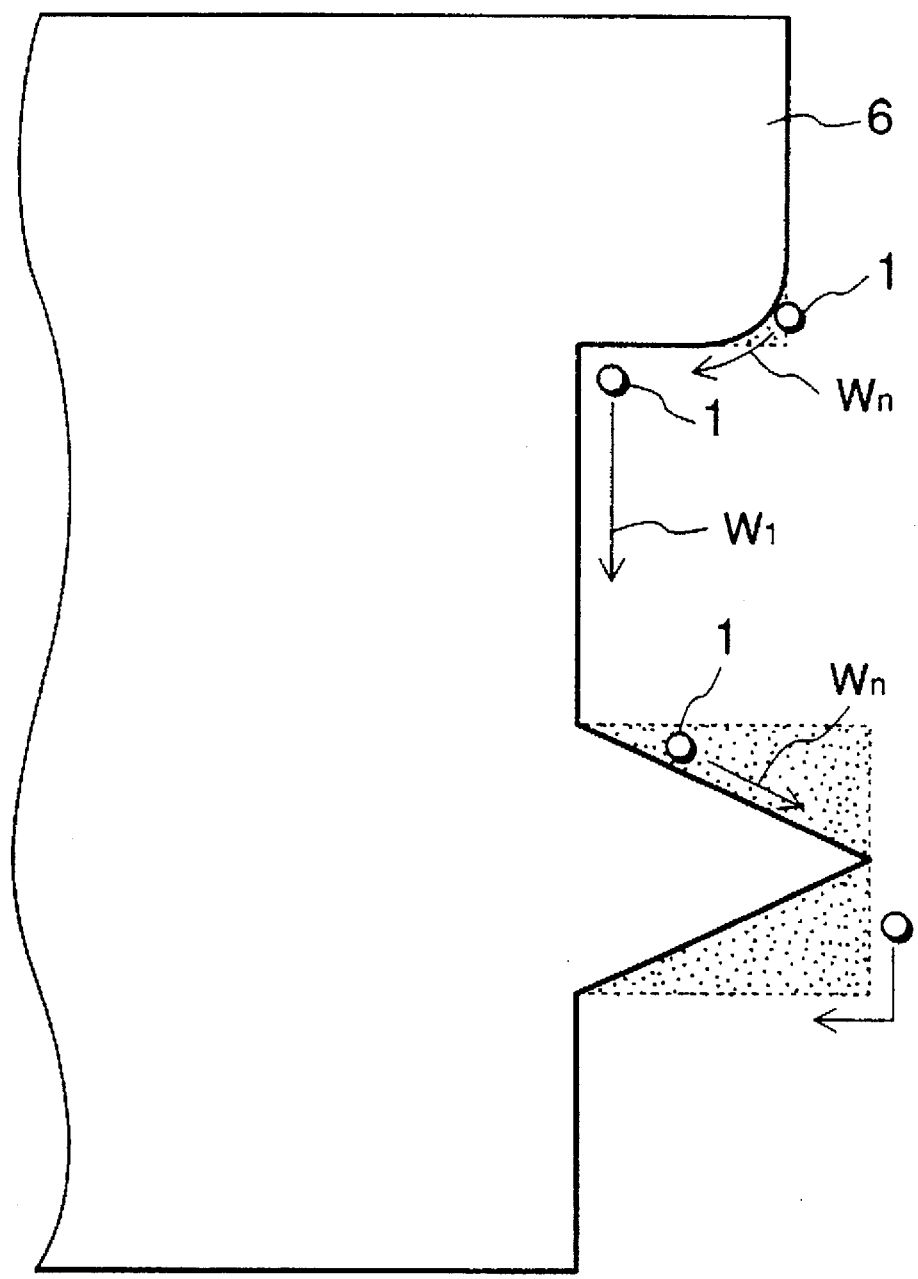
FIG. 2 is diagram illustrating the initial machining and detailed machining for grinding wheel forming method according to Embodiment 1 of the invention.
Figure 5A:
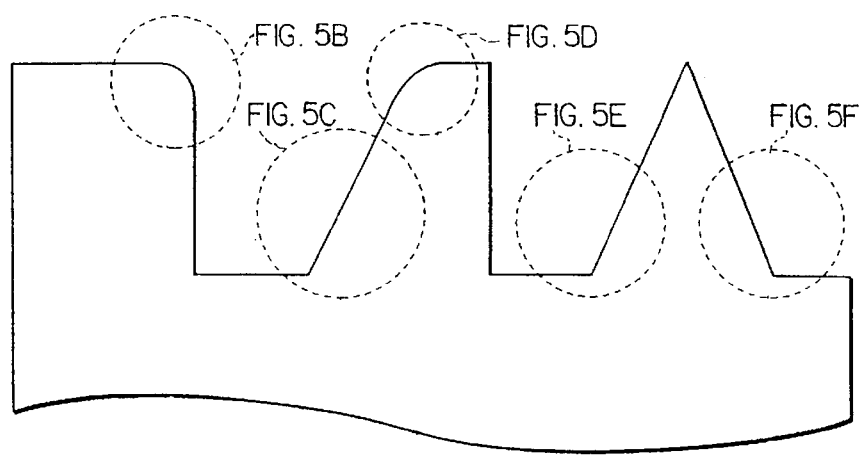
FIGS. 5A–5E are diagrams illustrating a shaping method for dividing the detailed machining by the grinding wheel forming apparatus according to Embodiment 1 of the invention.
Figure 5B:
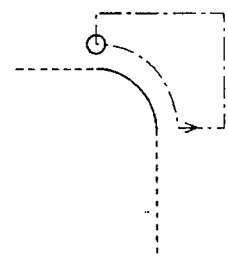
Figure 5C:
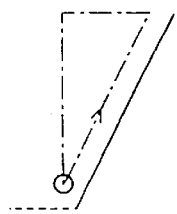
Figure 5D:
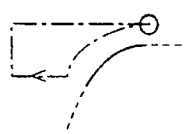
Figure 5E:
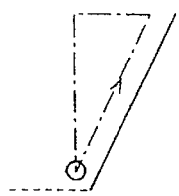
Figure 5F:
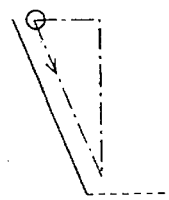

FIG. 2 is a cross sectional view of a machining example according to Embodiment 1 of the invention. Arrows indicate the loci of travel during the initial machining and the detailed machining (i.e., machining that is performed with high accuracy), and dotted portions indicate those areas to be removed by the detailed machining.

The cross section in FIG. 2 shows the initial machining W1 during which the wire electrode 1 is moved parallel to and vertical relative to the rotating metal bond wheel 6, and the detailed machining Wn during which a sloped portion and an arc portion are formed. The dotted portions indicate those areas that are to be processed during the detailed machining Wn. The arrows indicate the direction of movement for the individual formation processes.

In the cross sectional view in FIG. 3, while discharge energy is gradually reduced during the first detailed machining step Wn1 and the second detailed machining step Wn2, the speed at which the wire electrode 1 and the metal bond wheel 6 are moved relative to each other is gradually changed at arbitrary loci. During the third detailed machining step Wn3, the metal bond wheel 6 is formed into a desired shape. Arrows indicate movement direction Md for the individual formation steps. FIG. 4 is a table showing the discharge energy and the movement speeds at the individual detailed machining steps Wn1 through Wn3. Voltages, peak current, on time values and halt values are values that are set by the energy control means 9, by the manipulation of various switches which are provided for the machining power source 8 in FIG. 1, to obtain a desired discharge energy.

FIG. 5 is a cross sectional view of various portions to be finished during the detailed machining are separated and formed into desired shapes by detailed machining. Arrows indicate the directions of movement for the individual forming processes, and the shapes indicated by broken lines represent the loci of the arrows.

Figure 6A:
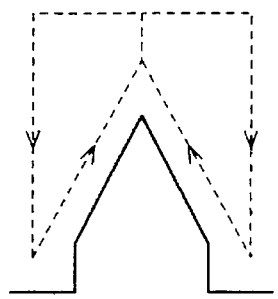
FIGS. 6A and 6B are diagrams depicting a method for forming a sharp distal end with the grinding wheel forming apparatus according to Embodiment 1 of the invention.
Figure 6B:
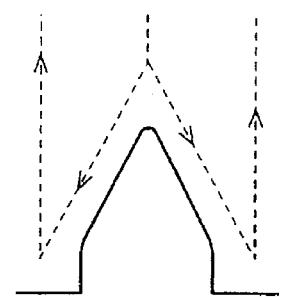

FIG. 6 is a cross sectional view of the relative movements of the loci for the wire electrode 1 and the metal bond wheel 6 to shape a comparatively sharp distal end during the detailed machining; with FIG. 6(A) shows an example wherein both sides are moved from the rear wall to the distal end, and with FIG. 6(B) shows an example wherein both sides are moved from the distal end toward the rear wall. Arrows indicate the directions of movement during the individual forming processes and the shapes indicated by broken lines represent the loci.

Figure 7A:
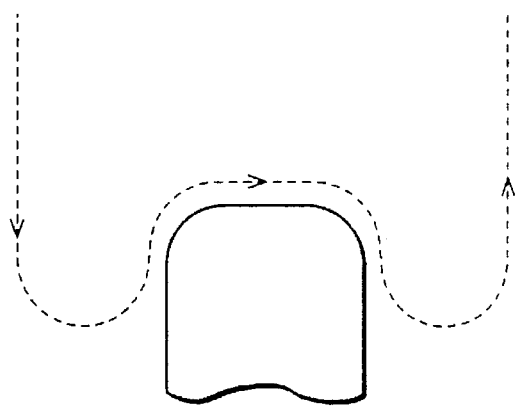
FIGS. 7A and 7B are diagrams showing a movement locus that is curved at a start point and an end point according to Embodiment 1of the invention.
Figure 7B:
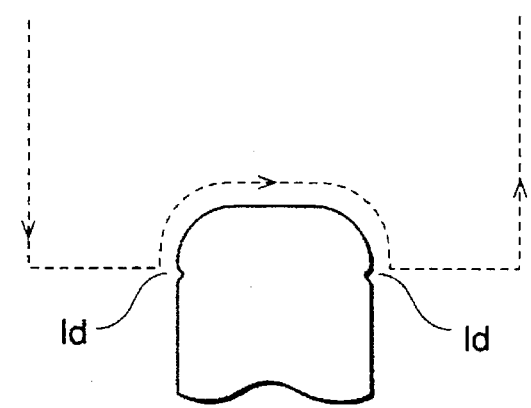

FIG. 7 is a cross sectional view for explaining the prevention of bite, a machining defect. FIG. 7 shows the relative movement of the loci for the metal bond wheel 6 and the wire electrode 1. FIG. 7(A) shows a locus forming arcs at a start point and an end point; FIG. 7(B) shows an example locus forming a straight line at a start point and an end point. Arrows indicate the directions of movement during the individual forming processes and the shapes indicated by broken lines represent the loci.

Figure 8A:
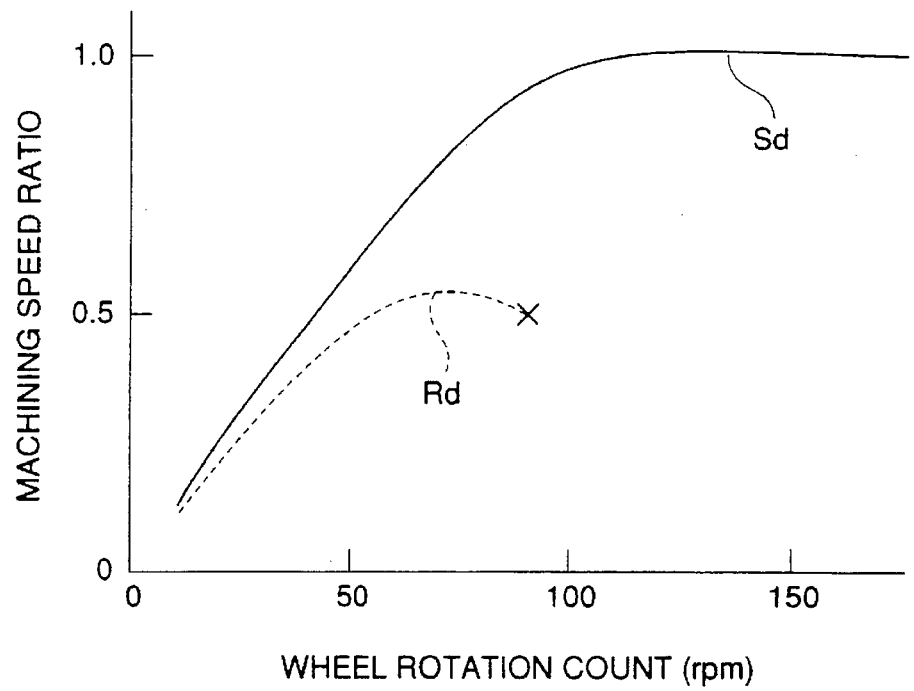
FIGS. 8A and 8B are diagrams showing the relationship between the wheel rotation speed and the machining speed for each rotational direction of the grinding wheel forming apparatus according to Embodiment 1 of the invention.
Figure 8B:
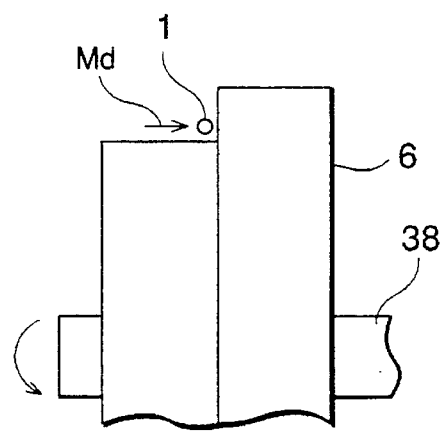

FIG. 8(A) shows the relationship between the wheel rotation speed and the machining speed ratio, for each rotational direction, obtained when, as depicted in FIG. 8(B), an electric discharge for shaping is generated at the gap between the rotating metal bond wheel 6 and the wire electrode 1 while the metal bond wheel 6, rotating with the shaft 38, and the wire electrode are moved relative to each other. In the graph of FIG. 8(A), the solid line represents a case wherein the wheel is rotated in the direction Sd, which is the same as the direction in which the wire electrode 1 is moved, and a broken line represents a case wherein the wheel is rotated in the direction Rd, which is the opposite of the direction in which the wire electrode 1 is moved. The shaded portion in the diagram shows the resulting condition, that area where the forming has been completed; the shaping process is performed through relative movement in the direction Md, indicted by the arrow. The machining speed ratio is a speed ratio for the individual parameters when the maximum speed is 1.0.

FIG. 9 is an illustration of groove machining showing the shaping of the metal bond wheel 6 while the wire electrode 1 is inclined. The hatched portion is the area where DC discharge is generated.

The method of the first embodiment of the invention will now be described while referring to FIGS. 2 through 9.

As is shown in FIG. 1, the wire electrode 1, which is a wire that is used as an electrode, is guided along the upper wire guide 2 and the lower wire guide 3, and travels at a constant speed in the wire movement direction Wn, while tension is applied to it by the tension application means 4, which is controlled by the tension application control means 5.

The metal bond wheel 6 is rotated by the rotation means 10. The number of times it rotates is controlled by the rotation speed control means 11, and the wheel rotational direction Tm is altered by the rotational direction change means 12.

The X axial motor 14 and the Y axial motor 15 drive the rotation means 10 that is fixed to the table 13, so that the metal bond wheel 6 is moved relative to the wire electrode 1. The numerical control means 16 computes a locus for the relative movement by using program data that are input by the program input means 21 and stored in the program memory means 22, and controls the X axial motor 14 and the Y axial motor 15. The numerical control means 16 controls the speed for relative movement by using the output of the relative speed control means 17, and the UV axes control means 20 drives the U axial motor 18 and the V axial motor 19 to incline the wire electrode 1.

An electric discharge is generated at the gap between the wire electrode 1 and the metal bond wheel 6 by applying a pulse voltage to the wire electrode 1 and the metal bond wheel 6 via a processing fluid. The processing fluid is supplied through the processing fluid supply nozzle 7. The switches of the machining power source 8 are controlled by the energy control means 9.

In response to a desired shape, the amount to be removed during the machining and the face accuracy, the detailed machining control means 23 controls the energy control means 9, tension application control means 5, rotation speed control means 11 and the relative speed control means 17. In this way the detailed machining control means 23 controls the performance of optimal detailed machining. When the shaping of the metal bond wheel 6 is performed, a constant tension is placed on the wire electrode 1 of a minute diameter. While the wire electrode 1 is traveling, the machining power source 8 supplies a voltage to the gap between the metal bond wheel 6 and the wire electrode 1. An electric discharge is thereby generated via a processing fluid.

Meanwhile, the rotation means 10 is controlled by the numerical control means 16 and moves the fixed table 13 relative to the wire electrode 1. In this way, the locus of the relative movement can be freely determined by preparing a control program, and the same locus can be provided many times by executing a stored control program. Since the numerical control means 16 computes the locus of the relative movement and the X axial motor 14 and the Y axial motor 15 are controlled in response to the acquired values, the movement is particularly precise. In addition, as the wire electrode 1 has a minute diameter, the discharge gap is narrow and uniform causing improved shaping process accuracy.

A shaping process method for generating electric discharge at the gap between the wire electrode 1 and the metal bond wheel 6 is divided into two procedures. One procedure is concerned with the initial machining W1 during which the wire electrode 1 is moved in parallel and vertical relative to the metal bond wheel 6 for shaping. The other procedure is concerned with the detailed machining Wn during which the slanted and arced portions are formed.

For the initial machining W1, which is a rough machining procedure, a great deal of shaping must be performed in as short a period as possible. During the initial machining W1 procedure, the discharge energy, the rotation speed, and the wire tension are set for the highest machining speed. Accuracy and speed are contradictory considerations for the initial machining W1 because the quantity to be machined is large and the speed would have to be drastically reduced to improve the accuracy. For example, to improve the accuracy by 30%, speed must be reduced by 60%. Thus, it is more efficient for the shaping during the initial machining to be performed while placing importance only on speed.

For machining the slanted portions and the arced portions of the grinding wheel 6 it is sufficient that the wire electrode 1 be moved in parallel with or perpendicular to remaining margins such as the hatched portions in FIG. 2 with the shaping to be completed during a subsequent procedure. During the detailed machining Wn, the finishing procedure, precise shaping is required. During the detailed machining Wn, the discharge energy, the rotation speed, and the wire tension are set to provide the most accurate condition possible. Because the quantity to be processed during the detailed machining Wn is small, the shaping accuracy is not deteriorated, even at high speed, and the accuracy can be improved by repeating the detailed machining a plurality of times.

In many cases, the portion of the metal bond wheel 6 requiring a high degree of accuracy for formation constitutes only one part of the wheel; as the detailed machining is necessary and performed for only such a portion, the required time period for shaping can be shortened. An alternate shaping method may be substituted for the initial machining W1, and the method of the invention may be used for only the detailed machining Wn to provide high efficiency.

During the performance of the detailed machining a plurality of times, the shaping is performed while the discharge energy is reduced in increments and the speed for relative movement is altered in an incremental manner. Because the wire electrode 1 employed has a minute diameter, the discharge gap is comparatively narrow and uniform and the shaping accuracy improves. To improve the accuracy even further, a narrower discharge gap is required. However, the discharge energy that is used must be small in order for the discharge gap to be narrowed, and this is not efficient at the first step of the detailed machining.

As is shown in FIG. 4, during the three-step detailed machining Wn1 through Wn3 shown in FIG. 3, at the first step Wn1, the margin of the metal bond wheel 6 is removed by using a comparatively large mount of discharge energy.

As is shown in FIG. 4; at the second step Wn2, the metal bond wheel 6 is finished and is given a desired shape by using an intermediate amount of discharge energy. During the third step Wn3, detailing of the angles of the slanted portions and small arcs are finished by using a small mount of discharge energy at a narrow discharge gap. Further, the speed for relative movement is optimized in response to the magnitude of the discharge energy thereby performing shaping at a higher accuracy.

The portions requiring detailed machining may be separately formed. In many cases, the portions of the metal bond wheel 6 which require precise accuracy comprise only one part. As a result, the shaping period can be reduced by performing detailed machining on only those portions. An independent relative movement locus is provided for each portion. In an example shown in FIG. 5, the detailed machining is performed in order, advancing from (a) to (e). The movement from one portion requiring detailed machining to another portion requiring detailed machining is rapid. In addition, the number of times the detailed machining is performed can be modified in response to the margin to be removed and the accuracy that is required. In the example in FIG. 5, the detailed machining step is required two times each for (a) and (b), and three times each for (d) and (e).

A shape with a sharp distal end is so formed by a movement locus traveling from the rear wall toward the distal end on both sides of the sharp distal end, as is shown in FIG. 6(A). FIG. 6(B) illustrates the employment of a movement locus along which shaping is performed from the distal end. This use results in a vibration of greater amplitude tending to affect the wire electrode 1 at the distal end at which discharge is begun. This method tends to cause rounding off of the sharp distal end. By the employment of a movement locus that travels toward the distal end, as in FIG. 6(A), both discharge concentration and vibration of the wire electrode are reduced so that a sharp distal end can be accurately formed.

FIG. 7 depicts a locus for an arc provided at the start point and the end point for shaping. When a straight line locus is provided for the start line and the end point as shown in FIG. 7(B) discharge tends to be centralized. This tends to increase the amplitude of the vibration of the wire electrode 1 thereby causing bites 1d. However, if, as shown in FIG. 7(A), an arched locus is provided at the start point and the end point to smooth the change in the discharge condition, the concentration of the discharge and the vibration of the wire electrode can be prevented, and a shape with no bites 1d can be provided.

The machining speed at which the electric discharge is generated for shaping at the gap between the wire electrode 1 and the metal bond wheel 6 is affected by the rotation speed of the metal bond wheel 6. As the rotation speed increases, the machining speed increases. An illustration of this relationship is shown in FIG. 8, when the diameter of the wire electrode is 0.2 mm, and the rotational direction of the metal bond wheel 6 is in the same movement direction as the wire electrode 1. The machining speed is affected by the increase in the number of metal bond wheel 6 rotations until the rotation speed is approximately 100 rpm. The same affect occurs when the rotational direction of the metal bond wheel 6 is in the opposite movement direction of the wire electrode 1, however, the machining speed reaches a maximum when the rotation speed is about 70 rpm. A higher rotation speed causes the wire electrode 1 to be cut. Consequently, steady shaping can be performed at a high machining speed and without the wire electrode 1 being broken so long as the rotation direction of the metal bond wheel 6 matches the movement direction of the wire electrode 1.

An appropriate example for groove machining will now be described while referring to FIG. 9. As is shown in FIG. 9, the metal bond wheel 6 is shaped by inclining the wire electrode 1. Specifically, since a discharge is generated that has a large width by inclining the wire electrode 1, the wire electrode 1 may be moved toward the wheel center to form a wide groove in the metal bond wheel 6. A benefit of this method is that a groove having a desired width can be formed by applying a specific angle to the wire electrode 1.

Specific examples for the individual means shown in FIG. 1 will now be described.

It is preferable that the tension application means 4 be a solenoid brake that can be electrically controlled and is capable of altering the applied tension in response to the diameter of the wire electrode 1 and the number of machining performances. The tension application control means 5 is the brake control means for electrically controlling the solenoid brake 4. The tension application control means controls the solenoid brake 4 in response to the output of the detailed machining control means 23. The energy control means 9 is a machining power source control device for controlling the peak current and the on time, off time, and no-load voltages of the machining power source. The energy control means 9 also provides a large energy supply during the rough machining procedure and a small energy supply during the finishing procedure in response to the output from the detailed machining control means 23.

The rotation means 10 is an inverted-driven alternate-current motor that can alter the rotation speed and the rotational direction of the metal bond wheel 6 to optimize performance in response to the diameter of the wire electrode 1 and the type of machining performed. The rotation speed control means 11 controls the frequency of the alternating-current motor 10, in order to electrically control the rotation speed. This controls the alternating-current motor 10 speed. The rotation direction control means 12 electrically controls the rotational direction and changes the rotational direction in response to the direction in which the wire electrode 1 is moved. The numerical control means 16 communicates with a computer and consequently controls the position and speed of the rotation means 10 in accordance with the computer instructions for a speed control schedule. The relative speed control means 17 communicates with a computer, to control the feeding speed for the rotation means 10. The computer formulates the instructions in response to the output of the detailed machining means 23 for the speed control process. The UV axes control means 20 communicates with a computer and drives the UV axial motors to control the inclination of the wire electrode 1 with the UV axes control process operated by computer software. Preferably, the program input means 21 is a factory automation device, a keyboard, or an input device using a paper tape, and is employed to input a numeric control program. Preferably, the program memory means 22 is semiconductor memory and is employed to store a numeric control program that is input.

Embodiment 2

Figure 10:
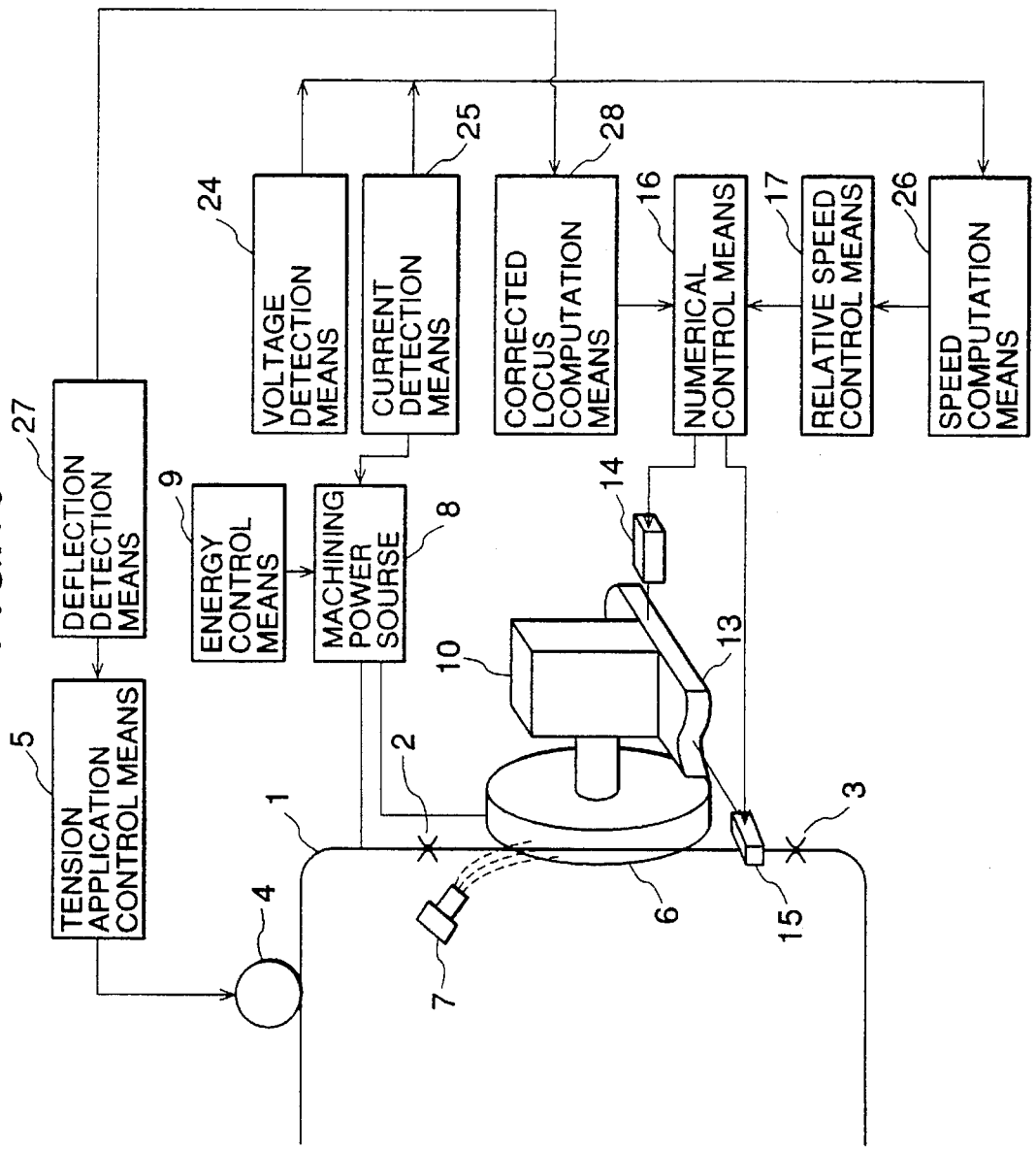
FIG. 10 is a schematic diagram illustrating the arrangement of a grinding wheel forming apparatus according to Embodiment 2 of the invention.

FIG. 10 is a schematic diagram illustrating the arrangement of a grinding wheel forming apparatus according to Embodiment 2 of the invention. Those reference numerals and symbols which correspond to those used in FIG. 1 denote identical or corresponding components.

In FIG. 10, Embodiment 2 of the grinding wheel forming apparatus further comprises voltage detection means 24 for detecting a voltage at a gap between the wire electrode 1 and the metal bond wheel 6 during the shaping; a current detection means 25 for detecting a current at the gap between the wire electrode 1 and the metal bond wheel 6 during the shaping; a speed computation means 26 for computing a movement speed for the table 13 by using the voltage and the current detected by the voltage detection means 24 and the current detection means 25; a deflection detection means 27 for detecting the deflection of the wire electrode 1 during the shaping; and a corrected locus computation means 28 for computing a corrected locus of relative movement by using the deflection detected by the deflection detection means 27.

Figure 11A:
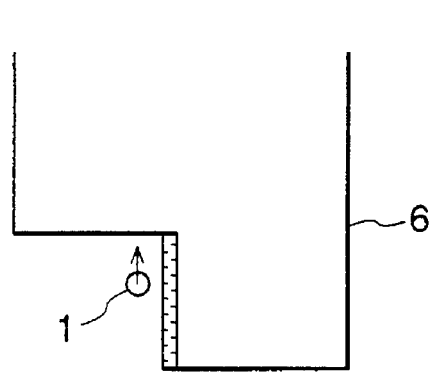
FIGS. 11A and 11B are diagrams for illustrating shaping conditions for the grinding wheel forming apparatus according to Embodiment 2 of the invention.
Figure 11B:
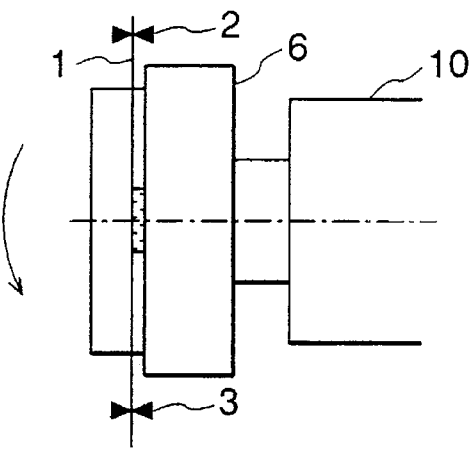
Figure 12:
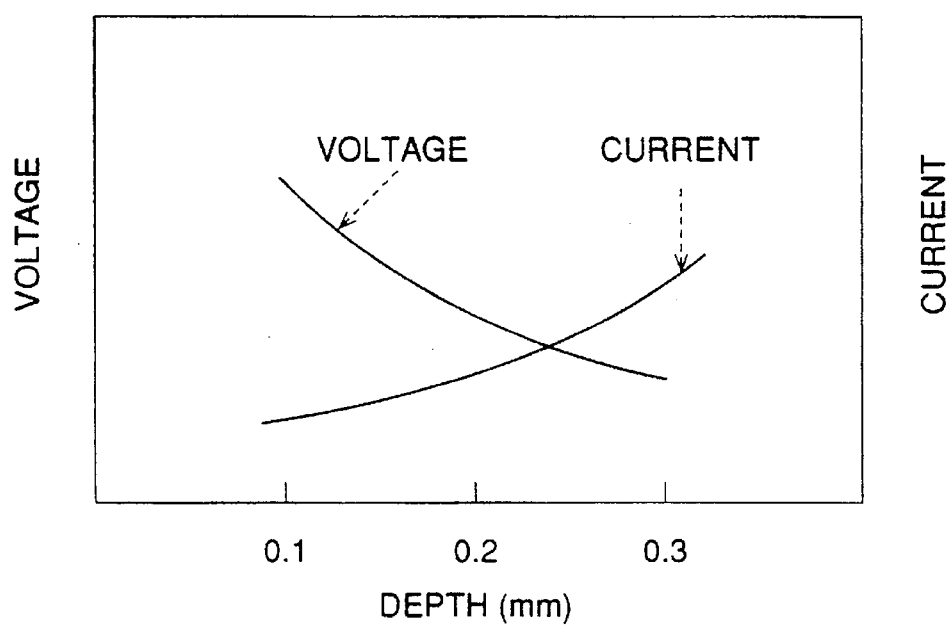
FIG. 12 is a diagram showing the relationship between the depth from the outer side of the grinding wheel and the voltage at the gap between the wire electrode and metal bond wheel and the current at the gap the grinding wheel forming apparatus according to Embodiment 2 of the invention.

FIG. 11(A) and 11(B) are diagrams showing the shaping process performed while the rotating metal bond wheel 6 and the wire electrode 1 are moved relative to each other and at a constant speed. Dotted portions signify those regions shaped while moving in the direction indicated by the arrow. FIG. 12 is a graph showing the average machining voltage and current as functions of the distance from the outer end face of the wheel during shaping performed as in FIG. 11.

Figure 13:
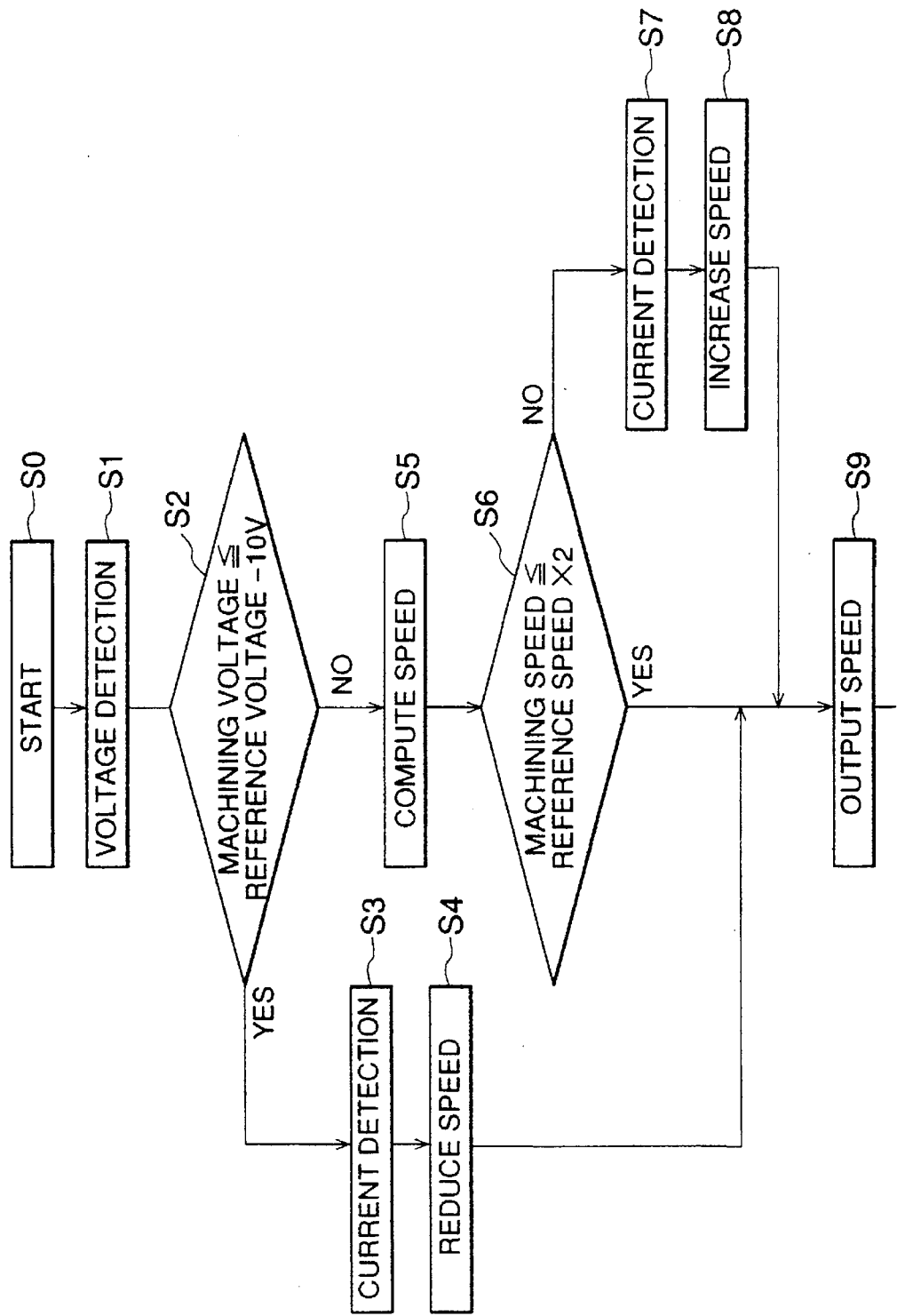
FIG. 13 is a flowchart showing a forming method for detecting the voltage and the current diagramed in FIG. 12, and for controlling the speed of the grinding wheel forming apparatus according to Embodiment 2 of the invention.

FIG. 13 is a flowchart of the movement speed computation.

Figure 14A:
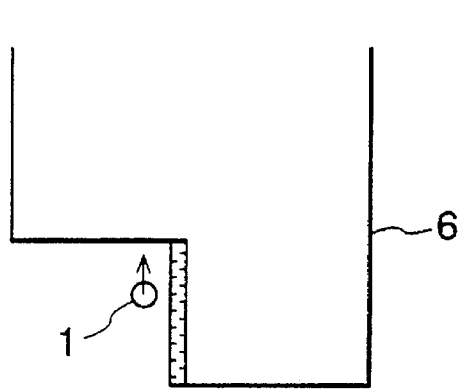
FIGS. 14A and 14B are diagrams illustrating another example of the shaping conditions for the grinding wheel forming apparatus according to Embodiment 2 of the invention.
Figure 14B:
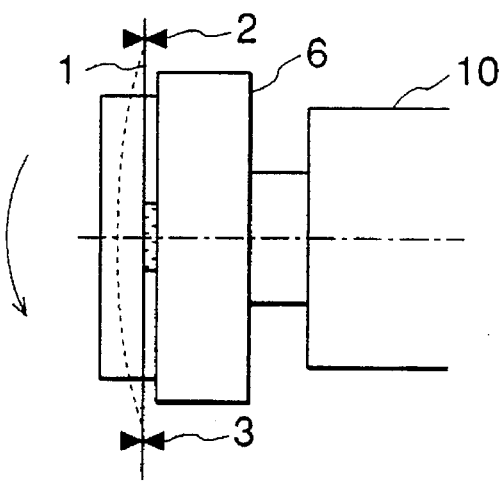
Figure 15:
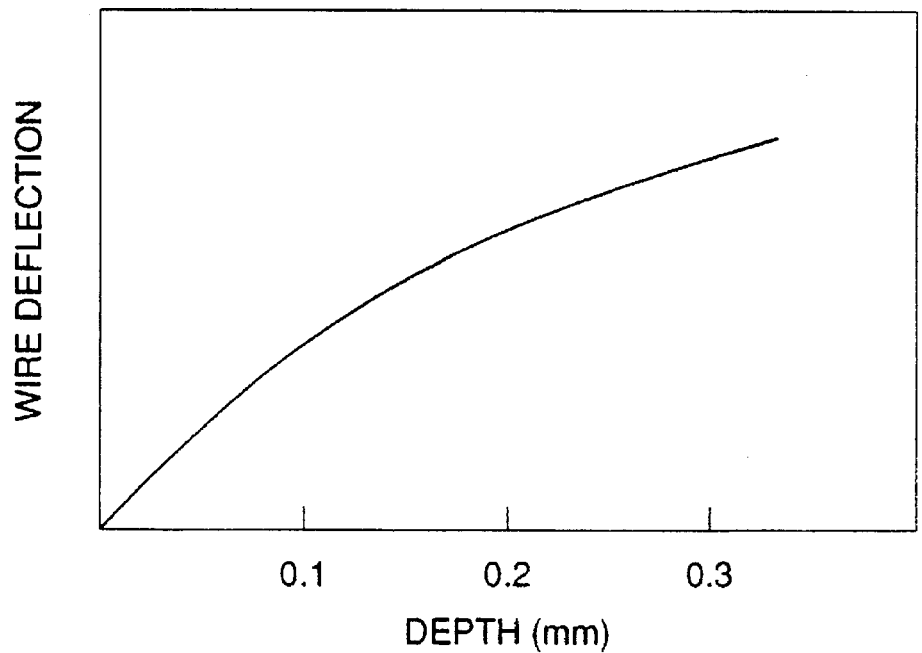
FIG. 15 is a graph showing the relationship between the depth of the outer side of the grinding wheel and the deflection of the wire electrode with the grinding wheel forming apparatus according to Embodiment 2 of the invention.

FIG. 14 is a diagram of the shaping process performed while the rotating metal bond wheel 6 and the wire electrode 1 are moved relative to each other and at a constant speed. Dotted portions are those that are currently shaped while moving in a direction indicated by the arrow. FIG. 15 is a graph showing the wire electrode 1 deflection as a function of the depth of a cut from the external face of the wheel toward the center during the shaping.

FIG. 16 is a cross sectional view showing the forming of a desired shape by moving the wire electrode 1 and the metal bond wheel 6 relative to each other while correcting for the deflection of the wire. FIG. 16(A) illustrates wire electrode 1 deflection which is not corrected for by the straight line shaping. The deflection is reduced near the outer surface, with the wall inclining as it moves toward the outward. FIG. 16(B) shows deflection corrected for by distance h in the straight shaping; the shaded portion being that which is corrected for, while the wall is perpendicular to the outer surface. FIG. 16(C) depicts an arc shifted so that it is moved away from the wire electrode 1 where no correction is made for the arc shape and the wire electrode 1 deflection is reduced as it nears the outer surface. In FIG. 16(D) an arc that is not shifted but is corrected for by distance h; the shaded portion being that which is corrected for. Broken lines in the diagram represent moving loci, and the shaping is performed as is indicated by arrows.

The operation of the second embodiment of the invention, as illustrated in the apparatus shown in FIG. 10, will now be explained while referring to FIGS. 11 through 16.

In FIG. 10, the voltage detection means 24 detects a voltage at the gap between the wire electrode 1 and the metal bond wheel 6, while the current detection means 25 detects a current at the gap between the wire electrode 1 and the metal bond wheel 6. The speed computation means 25 employs the detected voltage and current to compute a movement speed; the relative speed control means 17 and the numerical control means 16 respectively control the movement speed and the movement locus.

When the metal bond wheel 6 is shaped from the outer face toward the center at a constant movement speed, as shown in FIGS. 11 and 12, the quantity to be machined increases as the distance to the center decreases. As the distance to the center decreases, the voltage at the gap between the wire electrode 1 and the metal bond wheel 6 is reduced and the current at the gap is increased. When the shaping is performed at a constant movement speed, the voltage is high and the current is low at the outer entrance; therefore, the mount to be machined is small relative to the discharge energy and the machining is performed less efficiently. Since the mount to be machined is greater than the discharge energy when the voltage is insufficient at the rearmost location, a short-circuit occurs and the progress of the shaping is halted. Therefore, the movement speed is increased at the entrance on the external surface and reduced as shaping is performed for a deeper portion. This provides that a constant voltage and current are maintained at the gap between the wire electrode 1 and the metal bond wheel 6. As a result, a highly efficient constant shaping can be performed, change in the discharge gap can be reduced, and the accuracy for the shaping is improved.

Explanation of the processing performed by the speed computation means 26 to compute the movement speed using the detected voltage and current refers to the flowchart in FIG. 13. First, during step S0, a reference voltage and a reference speed are input to the speed computation means 26. During step S1, a voltage is detected by the voltage detection means 24. During decision step S2, the detected voltage is compared with the reference voltage. When the detected voltage is lower than the reference voltage by 10 V or more, the result is judged to be positive. As a result of that result, in step S3, the current detection means 25 detects a current resulting in a reduction in movement speed in step S4. However, if the detected voltage of step S1 is judged equal to or higher than (reference voltage −10 V)[*] the result is assessed to be negative in S3 and at step S5 the speed is computed by using the difference between the reference voltage and the detected voltage. At step S6, a check is performed to determine whether or not the speed is twice that of the reference speed. When the speed is twice or less than that of the reference speed, the shaping is performed at the computed speed. When the speed is equal to or higher than the reference speed, the decision considered negative. This negative judgment causes detection of the current during step S7, an increase in speed during step S8 in response to the detected current. At step S9, the speed that is obtained by the speed computation means 25 in this manner is output as speed output to the relative speed control means 17.

The correction for the wire electrode 1 deflection will now be explained while referring to FIGS. 14 through 16. The deflection means 27 in FIG. 10 detects the deflection of the wire electrode 1 during the shaping. The corrected locus computation means 28 computes a corrected locus for relative movement by using the deflection, which is detected by the deflection detection means 27. The numerical control means 16 controls the movement locus for forming the metal bond wheel 6.

Figure 16A:
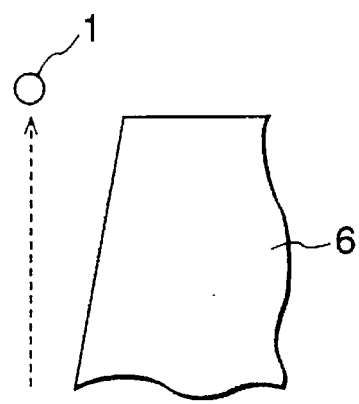
FIGS. 16A and 16B are diagrams illustrating a shaping method for correcting the deflection of the wire electrode with the grinding wheel forming apparatus according to Embodiment 2 of the invention.
Figure 16B:
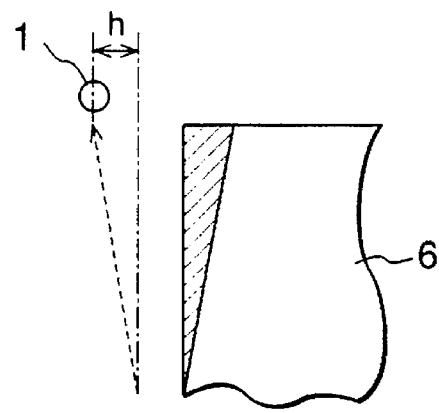
Figure 16C:
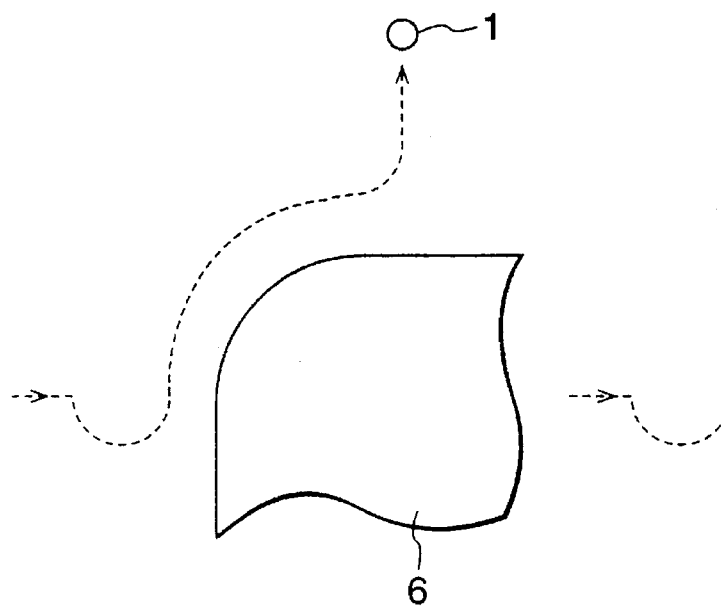
Figure 16D:
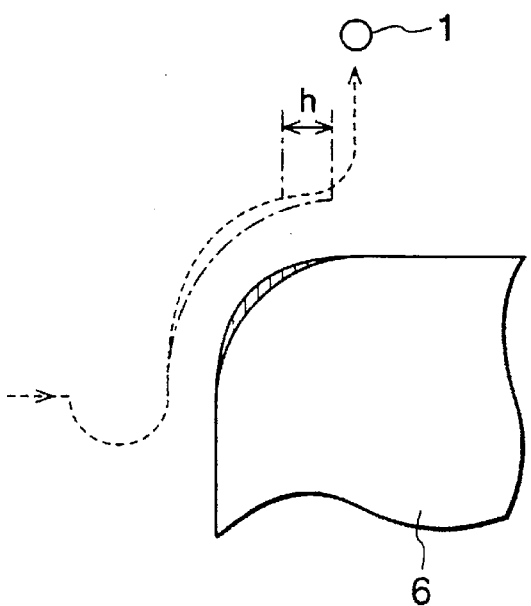

When the metal bond wheel 6 is shaped from the outer face toward the center, the amount to be machined increases toward the center. Thus, a discharge reaction force that is applied to the wire electrode 1 is increased, and as is shown in FIG. 14. The wire electrode 1 is deflected in the direction opposite the side where the discharge is generated. The relationship between the amount of wire deflection and the depth of the material machined is illustrated in FIG. 15. As the process progresses and reaches a deeper portion, the shape is applied, relative to the movement locus, in the direction opposite the side where the discharge is generated. In response to the deflection detected by the deflection detection means 27, inclination and shift of the end point at an arc portion are corrected for toward the side, relative to the movement locus, where the discharge is generated. As an illustrative example, FIG. 16(A) shows no correction made; the processed amount of the metal bond wheel 6 is increased on the rear (upper) side. FIG. 16(B) shows a correction in the mount of the distance h; the processed amount of the metal bond wheel 6 is constant. Similarly, in FIG. 16(C), the processed amount is increased at the left upper arc because there is no correction; FIG. 16(D) shows performance of a distance h correction and a processed amount constant.

Specific examples of the individual means in FIG. 10 will now be explained.

The voltage detection means 24 detects the average voltage at the output side of the machining power source and employs the average voltage to control the feeding speed. The current detection means 25 detects the average current at the output side of the machining power source and employs the average current to control the feeding speed. The speed computation means 26 communicates with a computer and computes the feeding speed by using the average voltage and average current. The deflection detection means 27 communicates with a computer and computes the wire electrode 1 deflection by using the detected wire tension values in the deflection detection process. The corrected locus computation means 28 communicates with a computer and computes a movement locus by using the wire electrode 1 deflection in the corrected locus computation process. The speed computation means, the deflection detection means, and the corrected locus computation means are each operated by computer software.

Embodiment 3

Figure 17A:
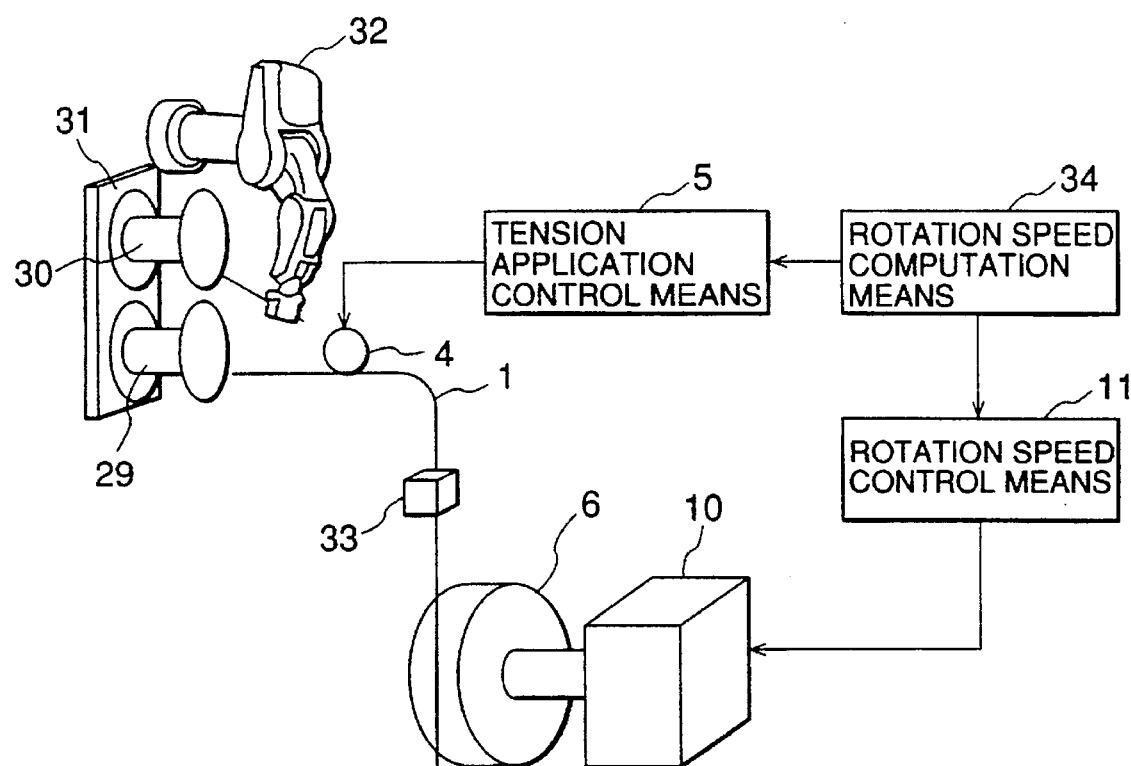
FIG. 17 is a schematic diagram illustrating the arrangement of a grinding wheel forming apparatus according to Embodiment 3 of the invention.
Figure 17B:
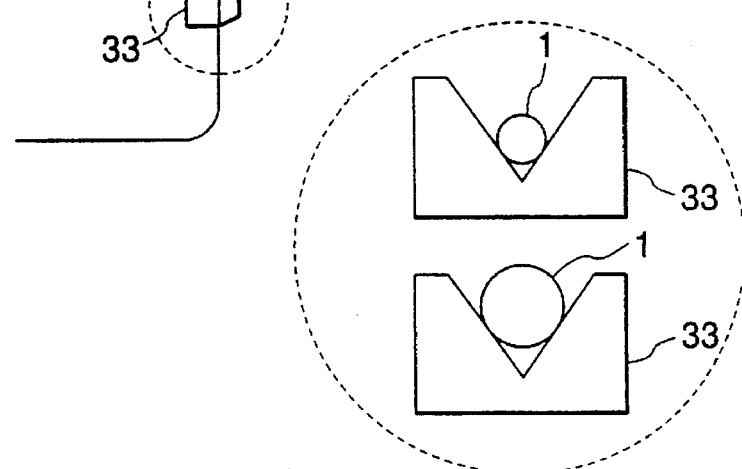

FIG. 17 is a schematic diagram illustrating the arrangement of a grinding wheel forming apparatus according to Embodiment 3 of the invention. Those reference numerals and symbols which correspond to those in FIG. 1 denote identical or corresponding components.

The grinding wheel forming apparatus of Embodiment 3 further comprises a first wire supply bobbin 29; a second wire supply bobbin 30; an attaching means 31 between the first wire supply bobbin 29 and the second wire supply bobbin 30; a wire electrode change means 32 for changing the wire electrode 1 between the first wire supply bobbin 29 and the second wire supply bobbin 30; a V groove wire guide 33 for guiding the wire electrode along a V groove that is opened toward the center of the wheel; and a rotation speed computation means 34 for automatically setting the rotation speed control means 10 to vary in response to the tension that is applied to the wire electrode 1.

Figure 18A:
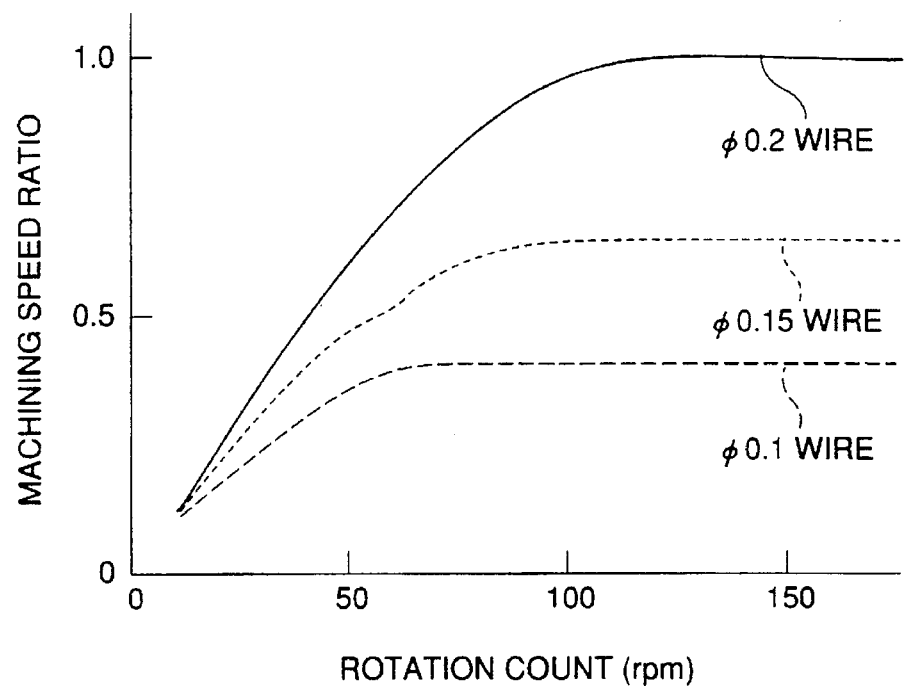
FIGS. 18A and 18B are diagrams showing the relationship between the wheel rotation speed and the machining speed ratio for each diameter of a wire electrode of the grinding wheel forming apparatus according to Embodiment 3 of the invention.

FIG. 18(A) is a graph showing the machining speed ratio as a function of the wheel rotation speed for each diameter of the wire electrode 1. While discharge is generated at the gap between the rotating metal bond wheel 6 and the wire electrode 1, the metal bond wheel 6 and the wire electrode 1 are moved relative to each other. The solid line signifies the wire electrode 1 having a diameter of 0.2 mm; the dotted line signifies the wire electrode 1 having a diameter of 0.15 mm; and the broken line denotes the wire electrode 1 having a diameter of 0.1 mm.

Figure 18B:
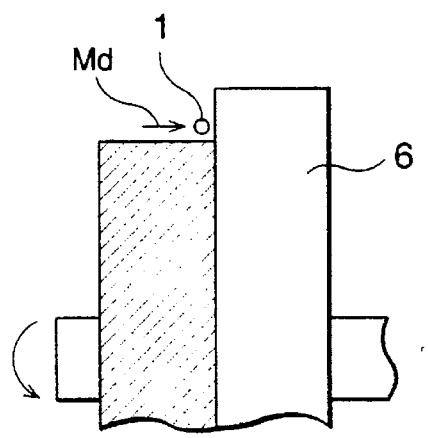

The shaded portion in FIG. 18(B), illustrating the shaping condition, indicates that area for which shaping has been completed. The shaping is performed while the metal bond wheel 6 and the wire electrode 1 are moved relative to each other and in the direction Md indicated by the arrow. The machining speed ratio is the speed ratio for the individual parameters when the maximum speed is 1.0. This maximum speed is represented for the case where the wire electrode 1 has a diameter of 0.2 mm.

Figure 19A:
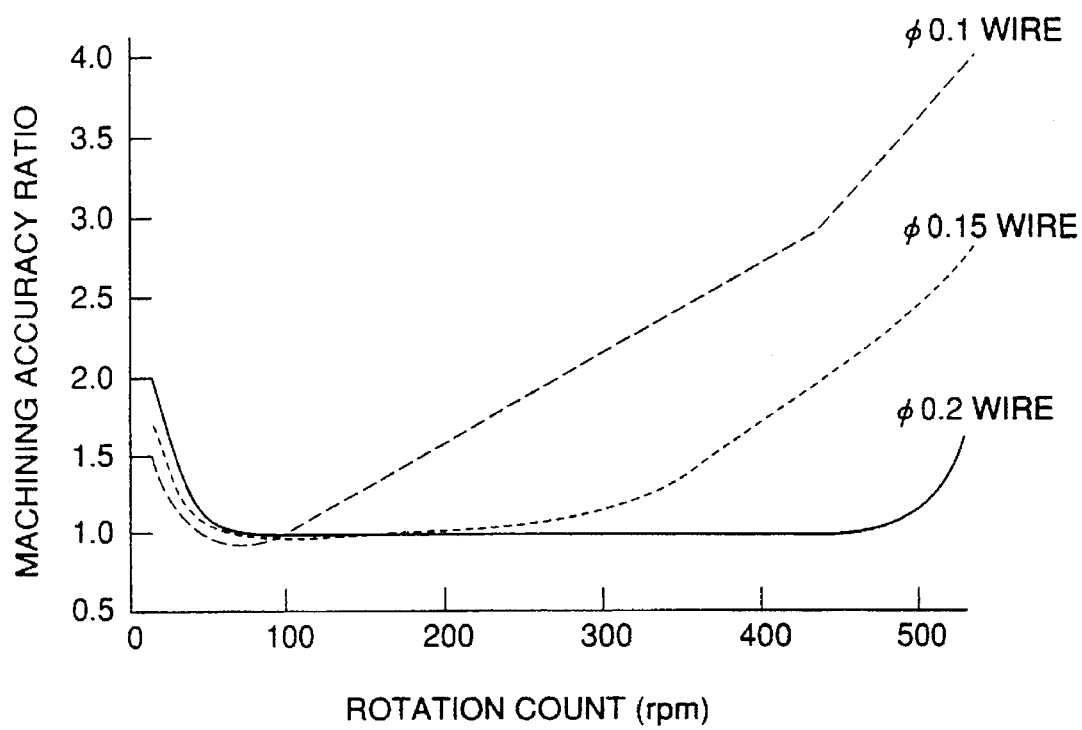
FIGS. 19A and 19B diagrams showing the relationship between the wheel rotation speed and the machining accuracy ratio for each diameter of a wire electrode of the grinding wheel forming apparatus according to Embodiment 3 of the invention.
Figure 19B:
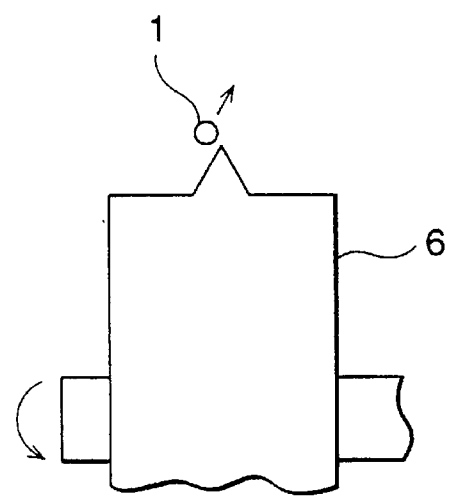

FIG. 19(A) is a graph showing the relationship between the wheel rotation speed and the machining accuracy ratio. This relationship is graphed for each diameter of the wire electrode 1. The solid line denotes the wire electrode 1 having a diameter of 0.2 mm; the dotted line indicates the wire electrode 1 having a diameter of 0.15 mm; and the broken line signifies the wire electrode 1 having a diameter of 0.1 mm. The shaping is performed by moving the metal bond wheel 6 and the wire electrode 1 relative to each other in the direction indicated by the arrow to provide the shape shown in FIG. 19(B). The machining accuracy ratio is the ratio of accuracy for the individual parameter when the highest accuracy is 1.0. This machining accuracy maximum is represented for the case where the wire electrode 1 has a diameter of 0.2 mm.

Figure 20A:
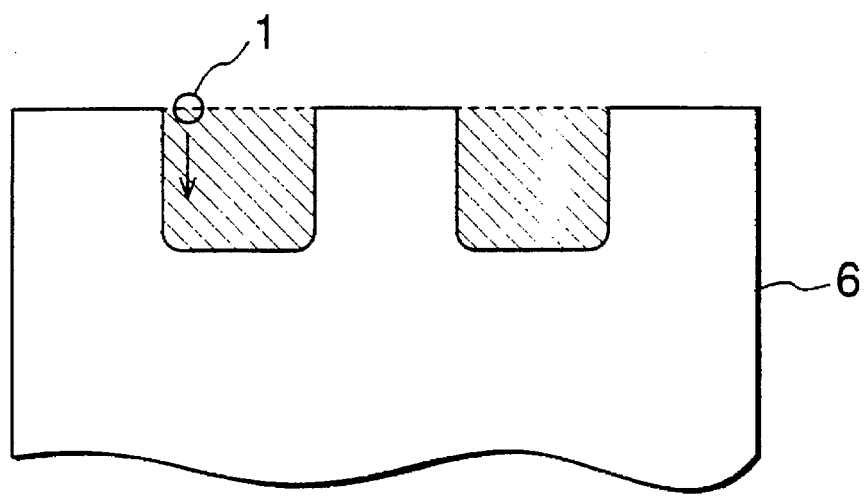
FIGS. 20A and 20B depict a shaping method for changing the diameter of a wire electrode of the grinding wheel forming apparatus according to Embodiment 3 of the invention.
Figure 20B:
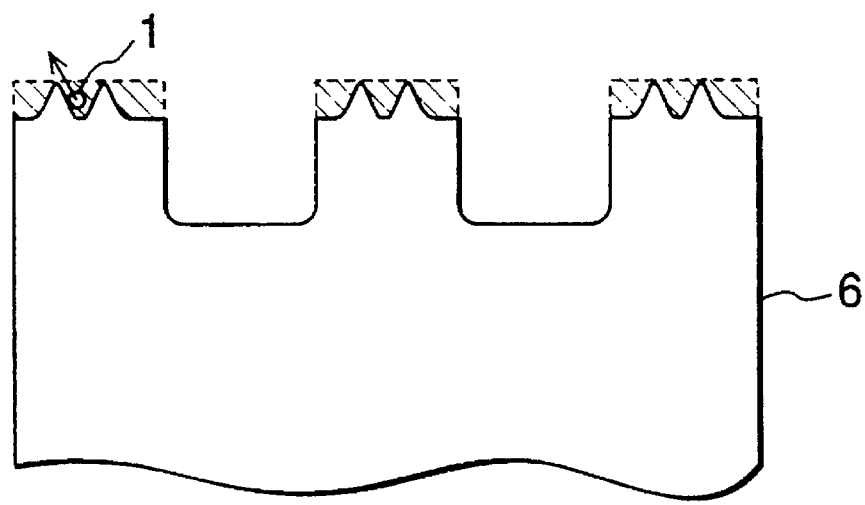

FIG. 20 is a cross sectional view of initial machining and detailed machining programs with different diameter wire electrodes 1 corresponding to the type of machining. FIG. 20(A) illustrates an initial machining process and FIG. 20(B) shows a detailed machining process. The shaded portions are those that are removed, by the processes respectively and the arrows indicate the movement directions of the individual processes.

The operation of the third embodiment of the invention will now be described.

In FIG. 17, the wire electrode 1 is fed along the wire electrode route from the first wire supply bobbin 29; tension is applied to the wire electrode 1 by the wire tension application means 4. The wire electrode 1 is guided by the V groove wire guides 33 which are located before and after the metal bond wheel 6 and are open toward the center of the metal bond wheel 6. To replace the first wire electrode with the second wire electrode, change means 32 pulls the wire electrode 1 from the second wire electrode supply bobbin 30, and stretches out the wire electrode along the wire electrode route described above. These V groove wire guides 33, which open toward the center, can be used even though the wire electrode 1 is replaced with one having a different diameter. The guides are satisfactory for guiding the wire electrode 1 because the discharge reaction force at the wire electrode 1 does not act toward the center of the metal bond wheel 6 even though the wire electrode 1 is pressed against the guides.

When the diameter of the wire electrode 1 is changed, the tension that is applied to the wire electrode 1 is also changed. The rotation speed is computed by the rotation speed computation means 34 and the rotation speed is altered by the rotation speed control means 11 in response to the output from the tension control means 5.

The relationship between the rotation speed of the metal bond wheel 6 and the machining speed for each wire electrode diameter is shown in FIG. 18. For the φ0.2 wire electrode 1, the machining speed increases in relationship to the rotation speed until the rotation speed reaches 120 rpm; thereafter the machining speed remains constant throughout the greater rotation speed. For the φ0.15 wire electrode 1, the machining speed increases in relationship to the rotation speed for the metal bond wheel 6 until the rotation speed reaches 100 rpm and remains constant throughout the greater rotation count. For the φ0.1 wire electrode, the speed increase in relationship to the rotation speed until the rotation speed reaches 65 rpm and thereafter is constant at greater rotation speed.

The relationship between the rotation speed of the metal bond wheel 6 and the machining accuracy for each wire electrode diameter, is shown in FIG. 19. For the φ0.2 wire electrode 1, high accuracy is available between 80 rpm and 450 rpm. For the φ0.15 wire electrode 1, high accuracy is available between 80 rpm and 200 rpm. For the φ0.1 wire electrode 1 high accuracy is available between 70 rpm and 100 rpm. As described above, the appropriate rotation speed varies depending on the diameter of the wire electrode 1 used in the apparatus. When the diameter of the wire electrode 1 is changed, the rotation speed is changed in a corresponding manner. In this way, shaping can be performed at a higher machining speed and more accurately.

As is shown in FIG. 20(A), a wire electrode 1 having a large diameter is used during the initial machining period. FIG. 20(B) illustrates wire electrode 1, having a small diameter, used during the detailed machining to form a more refined shape. As previously discussed, the period for forming a more refined shape using a smaller diameter electrode is longer than that required for forming a grinding wheel with a larger wire electrode 1. Therefore, the period for forming a refined shape which requires, for example, the φ0.1 wire electrode 1, can be shortened as the initial machining is performed by using the φ0.2 wire electrode 1. Further, the φ0.1 wire electrode 1 need only be used on a necessary portion of the detailed machining, in this way, the processing time can be further reduced.

Embodiment 4

Figure 21:
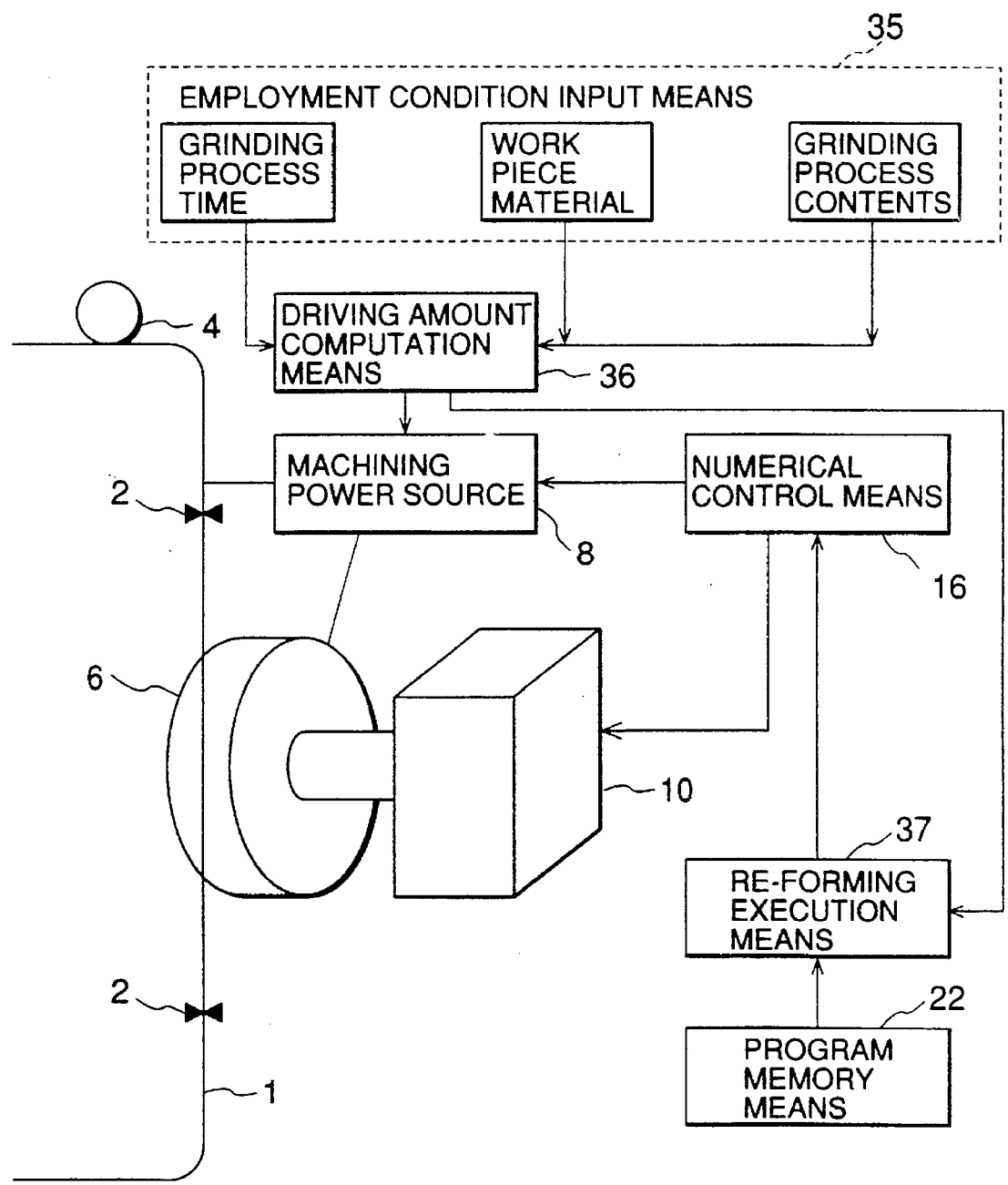
FIG. 21 is a schematic diagram illustrating the arrangement of a grinding wheel forming apparatus according to Embodiment 4 of the invention.

FIG. 21 is a schematic diagram illustrating the arrangement of a grinding wheel forming apparatus according to Embodiment 4 of the invention. Those reference numerals and symbols which correspond to those used in FIG. 1 denote identical or corresponding components.

The grinding wheel forming apparatus of Embodiment 4 further comprises employment condition input means 35 for inputting employment conditions, such as a grinding period, material of the grinding wheel, and particular events required during the grinding process; a driving amount computation means 36 for computing the amount of drive necessary for the re-shaping process in response to the above employment conditions; and a re-shaping execution means 37 for employing a computer program that is stored in the program memory means 22 to provide a desired shape for re-shaping a grinding wheel 6.

FIGS. 22(A) and (B) are cross sectional views showing a re-shaping process performed using a program that is created and stored in advance. The broken lines indicate loci MT, for the relative movements of the rotating metal bond wheel 6 and the wire electrode 1; d indicates the driving amount and the shaded portion is the area re-shaped by machining the distance equivalent to the driving amount d.

The operation of the fourth embodiment of the invention will now be described.

The employment conditions, such as the grinding period for using the metal bond wheel 6, the workpiece material, and the events required during the grinding process are input to the employment condition input means 35. The driving amount computation means 36 then computes the driving amount required for re-shaping the wheel from the input employment conditions. This original program for shaping is stored in the program memory means 22 and is then corrected by the driving amount. The re-shaping execution means 37 then controls the numerical control means 16 with the corrected program. In this way, the metal bond wheel 6 and the wire electrode 1 are moved relative to each other to perform re-shaping of the grinding wheel 6. Thus, a new program for the reshaping process does not have to be prepared.

The original program may be used to repeat the shaping many times while off-setting the program loci by the driving amount d. For example, for the shape shown in FIG. 22(B), the metal bond wheel 6 can be formed by using the driving amount d in FIG. 22 (B), and the re-shaping can thus be performed by the same program that was used originally.

Embodiment 5

Figure 23:
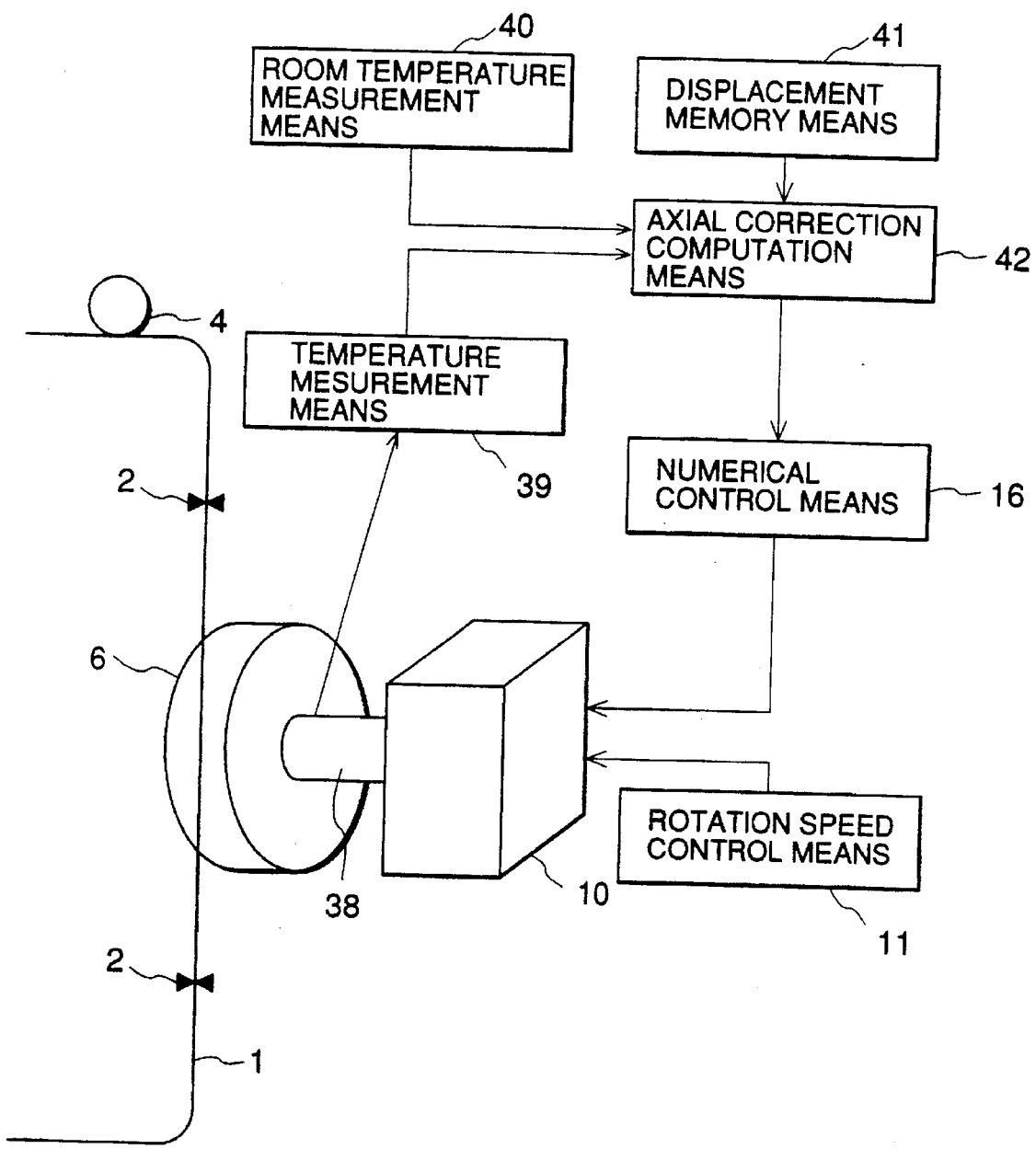
FIG. 23 is a schematic diagram illustrating the arrangement of a grinding wheel forming apparatus according to Embodiment 5 of the invention.

FIG. 23 is a schematic diagram illustrating the arrangement of a grinding wheel forming apparatus according to Embodiment 5 of the invention. Those reference numerals and symbols which correspond to those used in FIG. 1 denote identical and correspond components.

The grinding wheel forming apparatus of the Embodiment 5 further comprises an axle of rotation means 38; a temperature measurement means 39 for measuring the temperature of the shaft 38; a room temperature measurement means 40 for measuring the room temperature; a displacement memory means 41 for storing a displacement distance for each temperature of the axle 38; and a shaft correction computation means 42 for computing a correction for the displacement distance that is caused by a change in the temperature of the axle 38.

Figure 24:
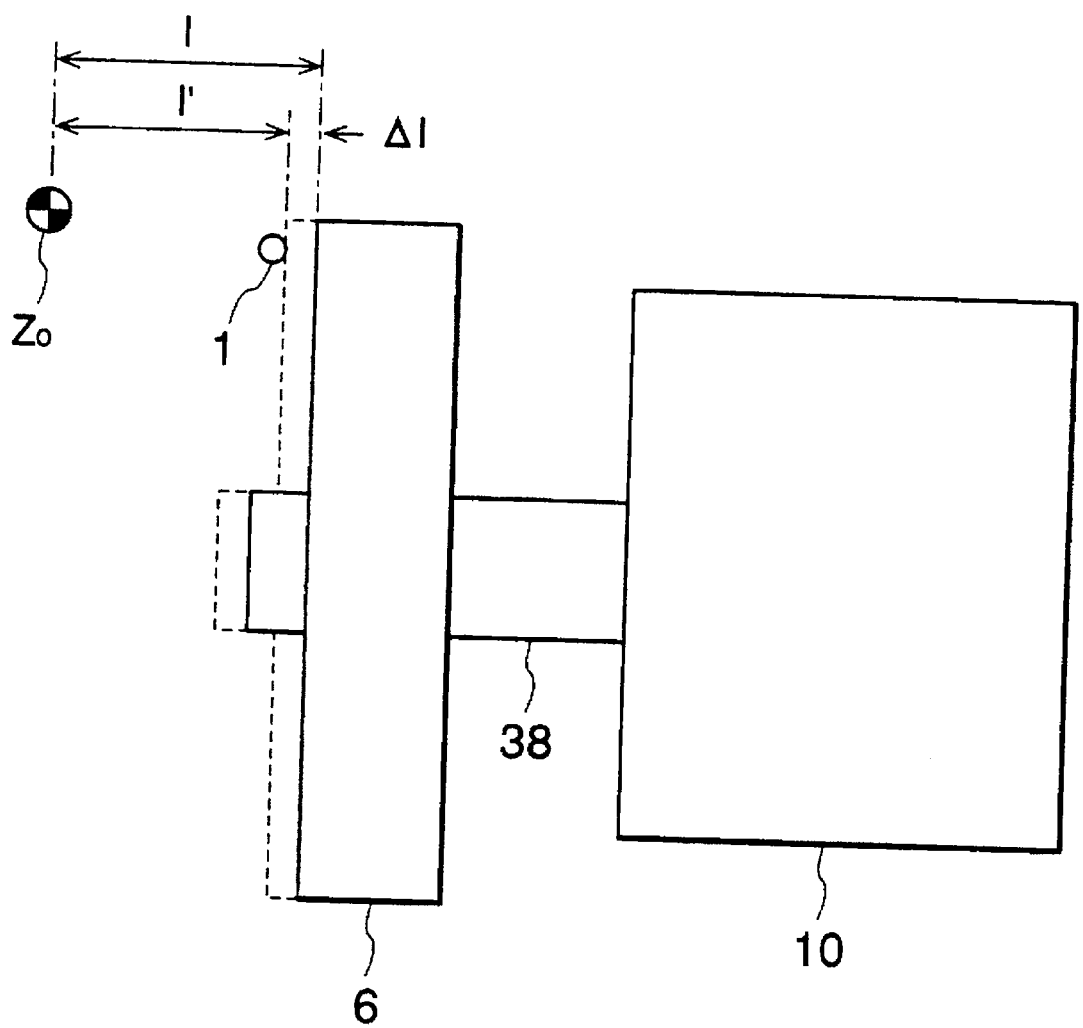
FIG. 24 is a diagram illustrating the positional shift due to a change in the temperature of an axle of the grinding wheel forming apparatus according to Embodiment 5 of the invention.

FIG. 24 is a diagram showing the positional shift in the metal bond wheel 6 due to a change in the temperature of the shaft 38. The distance from reference Z0 when the metal bond wheel 6 is stationary for a significant time is l, and the distance from the reference Z0 when the metal bond wheel 6 is rotated is l', and a displacement is Δl. The dotted line indicates the position of the metal bond wheel 6 after it is rotated.

The operation of the fifth embodiment of the invention will now be described.

The temperature of the shaft 38 is measured by the temperature measurement means 39; the room temperature is measured by the room temperature measurement means 40. When the rotary speed of the rotation means 10 is altered, the heat that is generated by the rotation varies and there is a corresponding temperature change in the shaft 38. This results in a corresponding positional displacement of the grinding wheel 6.

Based on the data in the displacement memory means 41, the shaft correction computation means 42 computes the correction for the displacement and corrects for it using the numerical control means 16 to control the relative movement and the difference between the axle 38 temperature and the room temperature. As a result, breaking-in with the pre-shaped wheel rotating and a change in the rotation speed can be performed across a wide range.

Embodiment 6

Figure 25:
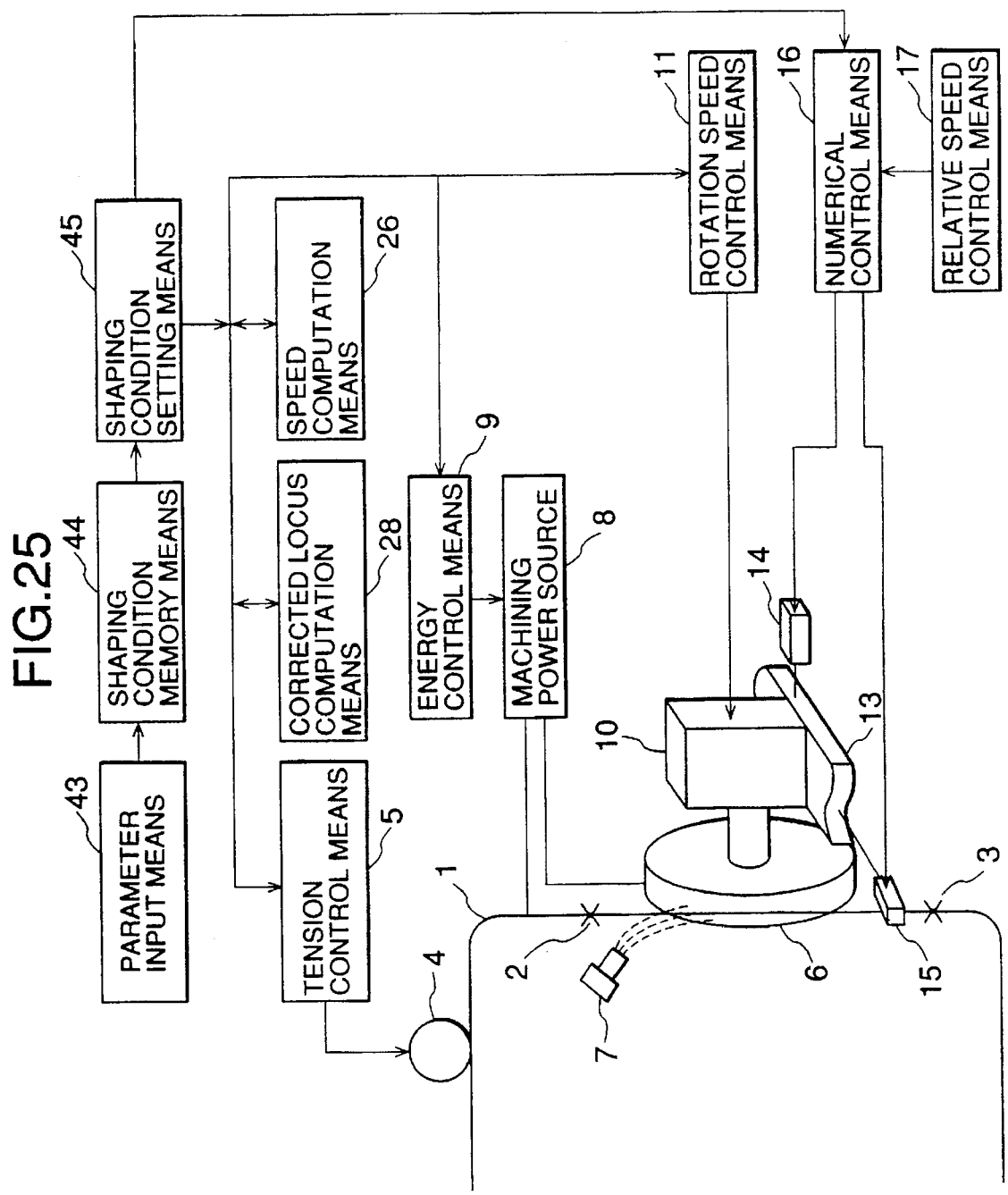
FIG. 25 is schematic diagram illustrating the arrangement of a grinding wheel forming apparatus according to Embodiment 6 of the invention.
Figure 27:
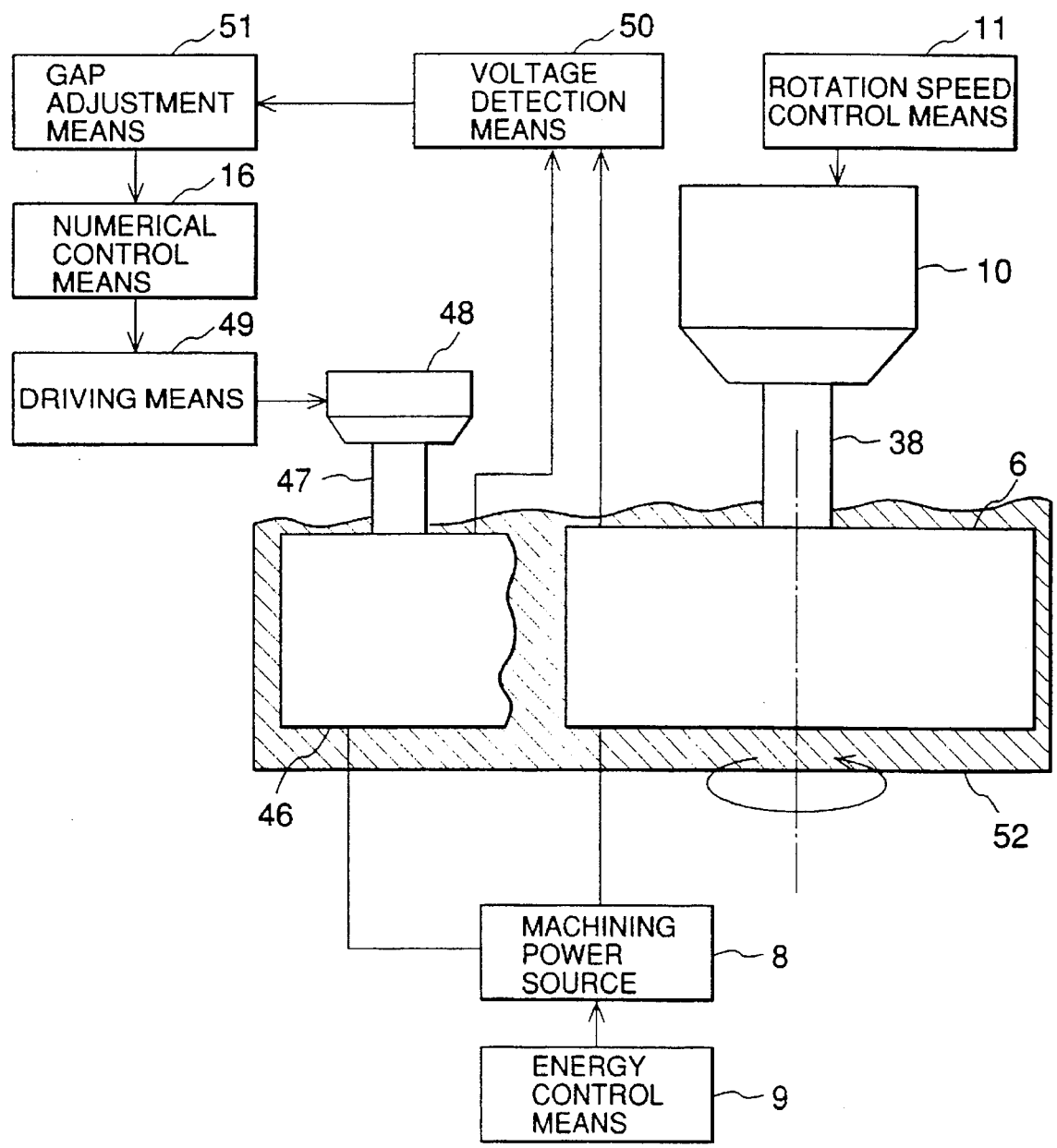
FIG. 27 is a schematic diagram illustrating the arrangement of a conventional grinding wheel forming apparatus.
Figure 28:
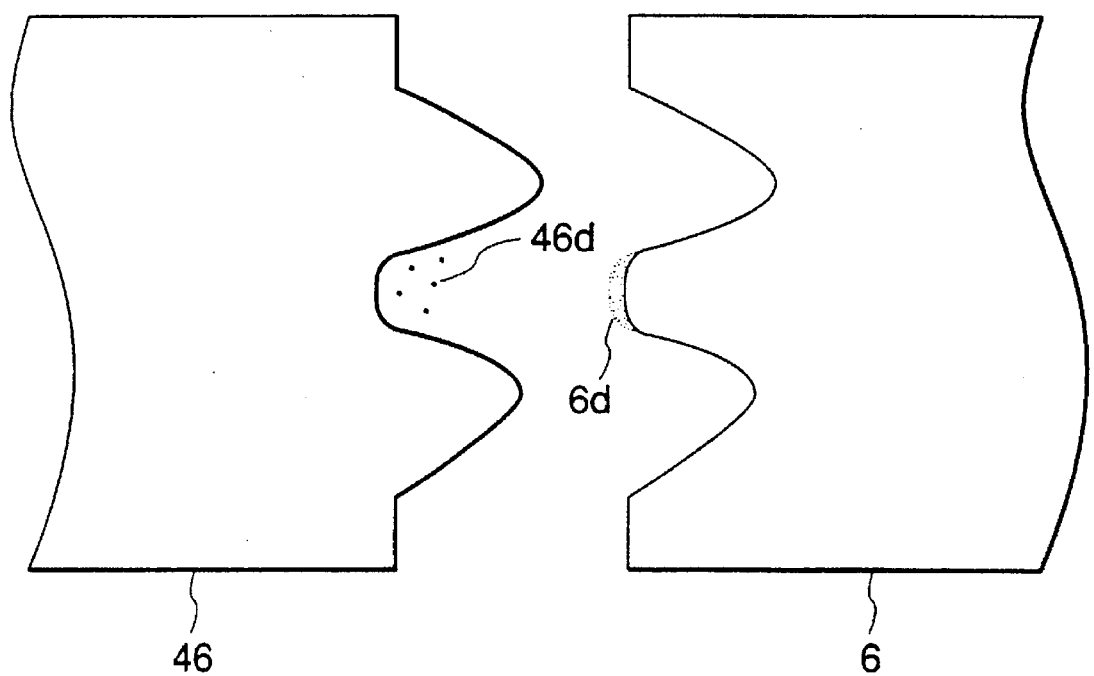
FIG. 28 is a diagram for explaining a conventional grinding wheel forming method.

FIG. 25 is a schematic diagram illustrating the arrangement of a grinding wheel forming apparatus according to Embodiment 6 of the invention. Those reference numerals and symbols corresponding to those used in FIGS. 1 and 10 denote identical and corresponding components.

The grinding wheel forming apparatus of Embodiment 6 further comprises parameter input means 43 for inputting shape parameters such as discharge energy, wire tension, wheel rotation speed, reference speed, reference voltage, and a correction value; a shaping condition memory device 44 for labelling a combination of the parameters as shaping conditions and storing the conditions; and a shaping condition setting means 45 for setting the stored shaping conditions. FIG. 26 is a diagram showing an input screen for the parameter input means 43, whereon, in the leftmost column, are shown parameter select switches and, in the uppermost row are shown, the labelling codes of the shaping conditions. The values are set into the matrix of the switches and the numbers are data.

The inputting shape parameters are input to the parameter input means 43 using specific labelling codes. This information is stored in the shaping condition memory means 44. The shaping conditions setting means 45 is capable of directly accessing the resulting stored shaping conditions using the appropriate labelling code. Alternatively, the shaping condition setting means 45 is capable of accessing the resulting storage shaping conditions by referencing a labelling code in a software code. For example, the shaping condition setting means 45 could access the resulting storage shaping condition labelled E100 by calling E100 in a software program. The condition for shaping would thereby be determined merely by setting the shaping condition number.

Turning to the specific arrangements of the individual means previously explained in the above described Embodiments 3 through 6, the combination of the Embodiments 3 through 6 will now be explained while referring to FIGS. 17, 21, 23 and 25. In FIG. 17, the attachment means 31 is formed of shafts around which two wire supply bobbins 29 and 30 are fitted and a plate to which the shafts are fixed. It is preferred that the wire electrode change means 32 be specifically replaced by an apparatus with a grasping mechanism that is capable of holding a wire electrode having a small diameter (approximately φ0.2). Wire having a large diameter is preferably used for rough or initial machining, whereas wire having a small diameter would be used for finishing refined shapes.

The rotation speed computation means 34 communicates with a computer and determines the rotation speed in response to wire tension data gathered during the rotation speed computation process.

The fourth embodiment of the present invention, as illustrated in FIG. 21, shows the employment condition input means 35 including a CRT, a keyboard, and a display device for communicating with a computer. During employment condition input process, performed by the computer software, the employment condition is the input. The driving amount computation means 36 communicates with a computer, estimates the amount of abrasion, and determines the driving amount utilizing the computer software. The re-shaping execution means 37 communicates with the computer and corrects for a programmed locus using the acquired driving amount with the re-shaping execution process performed by the software.

FIG. 23 illustrates the fifth embodiment of the invention which contains the temperature measurement means 39 for detecting the temperature using a temperature sensor that is attached to the axle. The room temperature measurement means 40 detects the room temperature using an extrinsic temperature sensor. The displacement memory means 41 stores specific memory of displacement value relative to a temperature difference between the axle and the room. The shaft correction computation means 42 communicates with a computer and computes the necessary correction amount utilizing the shaft correction computation computer software to analyze the difference between the room temperature and the temperature of the shaft.

Further, in FIG. 25 the illustration of Embodiment 6, the parameter input means 43 includes a CRT and a keyboard. The parameter input means communicates with a computer and inputs various shaping conditions to the parameter input process software. The shaping condition memory means 44 stores shaping conditions in response to the individual shaping parameters. The shaping condition setting means 45 includes a CRT and a keyboard. The shaping condition setting means 45 communicates with the computer to set various conditions, including speed, in the shaping condition setting process controlled by the software. The computer as described above may be semiconductor microprocessor integrated circuits; one or more computers may be employed in the apparatus.

The previously mentioned embodiments of the invention have the following advantages of: easily reducing grinding wheel processing time; improving grinding wheel shaping accuracy; preventing bites by reducing discharge concentration and wire electrode vibration; preventing the cutting of the wire electrode thereby performing stable shaping; easily providing grinding wheel re-shaping performed; improving re-shaping accuracy; increasing potential rotation speed variance using a displacement memory means; and performing automatic shaping by loading combinations of parameters for shaping conditions which may be stored and accessed.

The invention has been described with respect to certain preferred embodiments. Various modifications and additions within the spirit of the invention will occur to those of skill in the art. Accordingly, the scope of the invention is limited solely by the following claims.

What is claimed is:

1. A grinding wheel forming apparatus comprising:

a wire electrode for electric discharge machining;

a grinding wheel to be formed by electric discharge adjacent to the wire electrode;

rotation means for rotating said grinding wheel;

rotation speed control means for controlling the rotation speed of said grinding wheel;

energy control means for controlling discharge energy that is supplied to a gap between said wire electrode and said grinding wheel;

relative speed control means for controlling a relative movement speed between said wire electrode and said grinding wheel; and machining control means for controlling said rotation speed control means, said energy control means, and said relative speed control means so as to set the rotation speed for the grinding wheel and the discharge energy appropriately for detailed machining, and to set the movement speed for the wire electrode or the grinding wheel to enable high speed shaping during said detailed machining.

2. A grinding wheel forming apparatus according to claim 1, further comprising:

a voltage detection means for detecting a voltage at said gap between the wire electrode and the grinding wheel; and a current detection means for detecting a current at said gap between the wire electrode and the grinding wheel;

wherein said relative speed control means computes relative movement speeds for the wire electrode and the grinding wheel by using said detected voltage and current.

3. A grinding wheel forming apparatus according to claim 1, further comprising:

deflection detection means for detecting a deflection of the wire electrode at the grinding wheel; and a corrected locus control means for computing a relative movement locus for the wire electrode and the grinding wheel.

4. A grinding wheel forming apparatus according to claim 1, further comprising:

a plurality of wire supply bobbins wound with wire electrodes having different diameters; and wire electrode change means for selecting one of said wire electrodes to run from one of said plurality of wire supply bobbins to the grinding wheel;

wherein said rotation speed control means computes the number of rotations of the grinding wheel in response to a diameter of a selected wire electrode.

5. A grinding wheel forming apparatus according to claim 4, further comprising:

a groove opened substantially in a V-shape toward the grinding wheel; and a plurality of wire guides for guiding said wire electrode.

6. A grinding wheel forming apparatus according to claim 4, further comprising tension application control means for controlling the application of tension on the wire electrode, wherein the number of rotations for the grinding wheel is varied in response to the tension of the wire electrode.

7. A grinding wheel forming apparatus according to claim 1, further comprising:

employment condition input means for inputting employment conditions;

driving distance computation means for computing a driving distance during a re-shaping process in response to said employment conditions; and re-shaping execution means for employing a program to provide a desired shape for re-shaping the grinding wheel in accordance with the driving distance which is computed by the driving distance computation means.

8. A grinding wheel forming apparatus according to claim 1, further comprising:

a temperature measurement means for measuring a temperature of a shaft of said rotation means; and a room temperature measurement means for measuring a room temperature;

a displacement memory means for storing a displacement distance for each temperature of said shaft; and a shaft correction computation means for correcting for the relative positions of the wire electrode and the grinding wheel in response to said displacement distances, which occur due to a change in the shaft temperature.

9. A grinding wheel forming apparatus according to claim 1, further comprising:

parameter input means for inputting shaping parameters;

shaping condition memory means for numbering combinations of said shaping parameters as shaping conditions and for storing said combinations; and shaping condition setting means for setting the stored shaping conditions.

10. A grinding wheel forming method comprising:

rotating a grinding wheel; and running a wire electrode across the grinding wheel;

moving the wire electrode and the grinding wheel relative to each other;

controlling the relative movement speed between said wire electrode and said grinding wheel using a relative speed control means;

controlling the rotation speed of the grinding wheel using a rotation speed control means; and generating a discharge via a processing fluid at a gap between said wire electrode and said grinding wheel;

discharging energy from the wire electrode to the gap to shape the grinding wheel;

controlling said energy discharging using an energy control means; and controlling said relative speed control means, rotation speed control means, and said energy control means while said grinding wheel is rotated so as to set the rotation speed for the grinding wheel and the discharge energy for a detailed machining, and to set the movement speed for the wire electrode or the grinding wheel to enable high speed shaping during said detailed machining.

11. A grinding wheel forming method according to claim 10, further comprising the steps of:

forming the grinding wheel by an initial machining, independent of a detailed machining step, during which shaping is performed while a constant finishing margin is retained for a desired shape; and forming the grinding wheel by a subsequent detailed machining during which said finishing margin is removed to provide said desired shape.

12. A grinding wheel forming method according to claim 10, further comprising the steps of:

performing said detailed machining a plurality of times, incrementally reducing the discharge energy supplied to the gap between said wire electrode and said grinding wheel; and incrementally altering the speed at which said wire electrode and said grinding wheel are moving relative to each other in response to the incremental reduction of the discharge energy so as to provide a desired shape for the grinding wheel.

13. A grinding wheel forming method according to claim 10, further comprising the steps of:

separating portions of said grinding wheel which require more accurate finishing during said detailed machining; and performing said detailed machining only for said portions to provide a desired shape.

14. A grinding wheel forming method according to claim 10, wherein detailed machining of a desired shape requires formation of a sharp distal end, said method further comprising the step of moving the wire electrode and the grinding wheel relative to each other so that the wire electrode moves from a rear of the desired shape toward the distal end, thereby forming the desired shape along a machining locus that travels toward the distal end.

15. A grinding wheel forming method according to claim 10, further comprises the steps of:

curving a locus for relative movements of the wire electrode and the grinding wheel before a shaping start point and close to a target surface located immediately before said start point; and curving said locus immediately before a shaping end point.

16. A grinding wheel forming method according to claim 10, further comprising the step of running the wire electrode in the same direction as a rotational direction of the grinding wheel.

17. A grinding wheel forming method according to claim 10, further comprising the step of moving said wire electrode in an inclined fashion toward said axle of said grinding wheel.

18. A grinding wheel forming method according to claim 10, further comprising the steps of:

detecting a voltage and a current at the gap between said wire electrode and said grinding wheel; and controlling a relative movement speed for the wire electrode and the grinding wheel in response to said detected voltage and current.

19. A grinding wheel forming method according to claim 10, further comprising the steps of:

detecting a deflection of the wire electrode at the grinding wheel; and controlling a relative movement locus for the wire electrode and the grinding wheel, thereby, correcting for a shift by a finished machined shape resulting from said detected deflection.

20. A grinding wheel forming method according to claim 10, further comprising the step of controlling the number of rotations of said grinding wheel in response to a diameter of said wire electrode.

21. A grinding wheel forming method according to claim 10, further comprising the step of altering the diameter of the wire electrode in response to one of the following machining steps:

initial machining performed perpendicular to the grinding wheel;

initial machining performed in parallel to the grinding wheel;

detailed machining forming an inclined portion; and detailed machining forming an arced portion.

22. A grinding wheel forming method according to claim 10, further comprising the step of re-shaping a worn out grinding wheel by setting a movement locus of the wire electrode and the grinding wheel inward toward the center of the grinding wheel by a given distance relative to a movement locus for an original shaping process for the grinding wheel.

* * * * *